US008891774B2

(12) United States Patent
Nishigori et al.

(10) Patent No.: US 8,891,774 B2
(45) Date of Patent: Nov. 18, 2014

(54) ACOUSTIC SIGNAL PROCESSING APPARATUS, PROCESSING METHOD THEREFOR, AND PROGRAM

(75) Inventors: Shuichiro Nishigori, Tokyo (JP); Shiro Suzuki, Kanagawa (JP); Akira Inoue, Tokyo (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 13/061,687

(22) PCT Filed: Jun. 30, 2010

(86) PCT No.: PCT/JP2010/061108
§ 371 (c)(1),
(2), (4) Date: Mar. 1, 2011

(87) PCT Pub. No.: WO2011/004744
PCT Pub. Date: Jan. 13, 2011

(65) Prior Publication Data
US 2012/0114142 A1    May 10, 2012

(30) Foreign Application Priority Data
Jul. 7, 2009    (JP) ................ P2009-160561

(51) Int. Cl.
| H04R 5/00 | (2006.01) |
| G10L 21/0208 | (2013.01) |
| G01V 3/12 | (2006.01) |
| H04S 1/00 | (2006.01) |
| G10H 1/36 | (2006.01) |
| H04R 5/04 | (2006.01) |
| G10L 19/008 | (2013.01) |

(52) U.S. Cl.
CPC .......... *G10L 21/0208* (2013.01); *H04R 2430/03* (2013.01); *G01V 3/12* (2013.01); *H04S 1/007* (2013.01); *G10H 1/361* (2013.01); *H04R 5/04* (2013.01); *G10L 19/008* (2013.01)
USPC .......................................................... 381/1

(58) Field of Classification Search
CPC ...... H04S 1/002; H04S 2400/05; H04S 1/007
USPC .......................................................... 381/1
See application file for complete search history.

(56) References Cited

U.S. PATENT DOCUMENTS

| 6,405,163 B1 * | 6/2002 | Laroche .................. 704/205 |
| 2006/0050898 A1 * | 3/2006 | Yamada et al. ............ 381/104 |

FOREIGN PATENT DOCUMENTS

| JP | 10-143171 | 5/1998 | |
| JP | 2003274492 A * | 9/2003 | .......... H04S 1/00 |
| JP | 2005-141121 | 6/2005 | |
| JP | 2005-326587 | 11/2005 | |
| JP | 2008-72600 | 3/2008 | |

OTHER PUBLICATIONS

International Search Report from the Japanese Patent Office, mailed Jul. 27, 2010, for International Application No. PCT/JP2010/061108.

* cited by examiner

*Primary Examiner* — Duc Nguyen
*Assistant Examiner* — Kile Blair
(74) *Attorney, Agent, or Firm* — Sony Corporation of America

(57) ABSTRACT

The present invention relates to an acoustic signal processing apparatus that suppresses auditory noise caused in a difference signal generated by acoustic signals of a plurality of channels, a processing method therefor, and a program.

A difference spectrum calculation unit 320 calculates, as a difference spectrum, the absolute difference value between frequency spectra of the left and right channels sent from frequency spectrum generation units 311 and 312. A low-level band determination unit 330 determines a difference spectrum corresponding to a low-level band among difference spectra of all the frequency bands. A substitution spectrum generation unit 350 generates a substitution spectrum for which a difference spectrum is substituted, on the basis of the frequency spectrum of the left channel. A spectrum substitution unit 360 substitutes the difference spectrum corresponding to the low-level band for a substitution spectrum corresponding to the difference spectrum. An accompaniment signal generation unit 370 generates an accompaniment signal by converting a frequency spectrum sent from the spectrum substitution unit 360 into a time-domain signal.

8 Claims, 18 Drawing Sheets ically to an acoustic signal processing apparatus that suppresses audio components included in an acoustic signal, a processing method therein, and a program for causing a computer to execute the method.

ACOUSTIC SIGNAL PROCESSING APPARATUS, PROCESSING METHOD THEREFOR, AND PROGRAM

TECHNICAL FIELD

The present invention relates to an acoustic signal processing apparatus, and more specifically to an acoustic signal processing apparatus that suppresses audio components included in an acoustic signal, a processing method therein, and a program for causing a computer to execute the method.

BACKGROUND ART

Hitherto, a large number of stereo signal processing apparatuses that suppress, based on a stereo signal in which vocals are located in the center, audio components of the vocals included in the stereo signal have been devised. For example, a vocal signal removing apparatus that subtracts a right-channel signal from a left-channel signal to remove vocal signals of the same phase and the same level included in both channels has been proposed (see, for example, PTL 1).

CITATION LIST

Patent Literature

PTL 1: Japanese Unexamined Patent Application Publication No. 63-50198 (FIG. 1)

SUMMARY OF INVENTION

Technical Problem

In the related art technique described above, a music signal can be obtained in which audio components, which are vocal signals included in a stereo signal, have been removed by subtracting a right-channel signal from a left-channel signal. However, generation of, based on a compressed signal produced by decoding a stereo signal compressed by encoding, a music signal that is a difference signal between the compressed signals of the left and right channels may cause noise in the auditory sense. This is because spectrum levels of the compressed signals of the left and right channels in the same frequency band are made equal by encoding processing on the stereo signal.

The present invention has been made in view of such a situation, and it is an object of the present invention to suppress auditory noise caused in a difference signal generated by acoustic signals of a plurality of channels.

Solution to Problem

The present invention has been made in order to solve the above problem, and its first aspect provides an acoustic signal processing apparatus including a difference spectrum calculation unit that calculates, as a difference spectrum, a difference between frequency spectra of acoustic signals of two channels including substantially equal frequency distributions of audio components among acoustic signals of a plurality of channels; a low-level band determination unit that determines a frequency band, in which a level drops rapidly in an envelope of the difference spectrum calculated by the difference spectrum calculation unit, to be a low-level band; a substitution spectrum generation unit that generates a substitution spectrum for which the difference spectrum is substituted, on the basis of at least one of the frequency spectra of the acoustic signals of the two channels; a spectrum substitution unit that substitutes a difference spectrum corresponding to the low-level band within the difference spectrum calculated by the difference spectrum calculation unit, for the substitution spectrum; and an accompaniment signal generation unit that generates an accompaniment signal by converting a frequency spectrum output from the spectrum substitution unit into a time-domain signal, and also provides a processing method therefor and a program for causing a computer to execute the method. This achieves the effect of allowing a substitution spectrum to be generated on the basis of frequency spectra of acoustic signals of two channels and allowing a difference spectrum corresponding to a low-level band in which a level drops rapidly in an envelope of the difference spectrum to be substituted for a substitution spectrum.

Further, in the first aspect, the substitution spectrum generation unit may be configured to generate the substitution spectrum on the basis of at least one frequency spectrum of the acoustic signals of the two channels and a predetermined level adjustment coefficient for adjusting the level of the substitution spectrum. This achieves the effect of allowing a level in which the level of at least one frequency spectrum of acoustic signals of two channels is multiplied by a level adjustment coefficient to be generated as a level of a substitution spectrum. In this case, the substitution spectrum generation unit may be configured to generate the substitution spectrum on the basis of the level adjustment coefficient of an audio band, which is smaller than the level adjustment coefficient corresponding to a band other than the audio band, and the level of the at least one frequency spectrum. This achieves the effect of allowing the degree of level drop of the substitution spectrum of the audio band to be greater than that in a band other than the audio band.

Further, in the first aspect, an audio coefficient setting unit that sets an audio coefficient corresponding to an audio band on the basis of the level ratio of, in at least one frequency spectrum of the acoustic signals of the two channels, the frequency spectrum corresponding to a band other than the audio band to the frequency spectrum corresponding to the audio band may be further provided, and the substitution spectrum generation unit may be configured to generate the substitution spectrum on the basis of the at least one frequency spectrum and the audio coefficient set by the audio coefficient setting unit. This achieves the effect of allowing a substitution spectrum to be generated using an audio coefficient corresponding to an audio band that is set on the basis of the level ratio of the average level of the frequency spectrum corresponding to a band other than the audio band to the average level of the frequency spectrum corresponding to the audio band. In this case, the audio coefficient setting unit may be configured to set the audio coefficient to be larger for a higher level of the frequency spectrum corresponding to the band other than the audio band, and to set the audio coefficient to be smaller for a higher level of the frequency spectrum corresponding to the audio band. This achieves the effect of allowing the audio coefficient setting unit to set an audio coefficient to be larger for a higher level of the frequency spectrum corresponding to a band other than the audio band and to set an audio coefficient to be smaller for a higher level of the frequency spectrum corresponding to the audio band.

Further, in the first aspect, the low-level band determination unit may be configured to determine the low-level band on the basis of a low-level threshold for specifying a frequency band in which a level drops rapidly in the envelope and each level of the difference spectrum. This achieves the effect of allowing the low-level determination unit to determine, in a case where each level of the difference spectrum is less than the low-level threshold, a frequency band corresponding to a difference spectrum less than the low-level threshold to be a low-level band. In this case, the low-level band determination unit may be configured to determine the low-level band using the low-level threshold, which is set on the basis of the level of at least one frequency spectrum of the acoustic signals of the two channels, and a level of the difference spectrum. This achieves the effect of allowing the low-level band determination unit to set a low-level threshold on the basis of the level of at least one frequency spectrum of acoustic signals of two channels.

Advantageous Effects of Invention

According to the present invention, the beneficial effect of being able to suppress auditory noise caused in a difference signal generated by acoustic signals of a plurality of channels can be achieved.

DESCRIPTION OF EMBODIMENTS

Modes for carrying out the present invention (hereinafter referred to as embodiments) will be described hereinafter. The description will be given in the following order:

1. First embodiment (Accompaniment signal generation method: an example of generating a substitution spectrum on the basis of the frequency components of the left channel)

2. Second embodiment (Accompaniment signal generation method: an example of setting an audio coefficient for adjusting levels of a substitution spectrum on the basis of the frequency components of the left channel)

3. Third embodiment (Accompaniment signal generation method: an example of generating a substitution spectrum on the basis of the frequency components of the right and left channels)

1. First Embodiment

[Example Configuration of Music Playback Apparatus]

Figure 1:
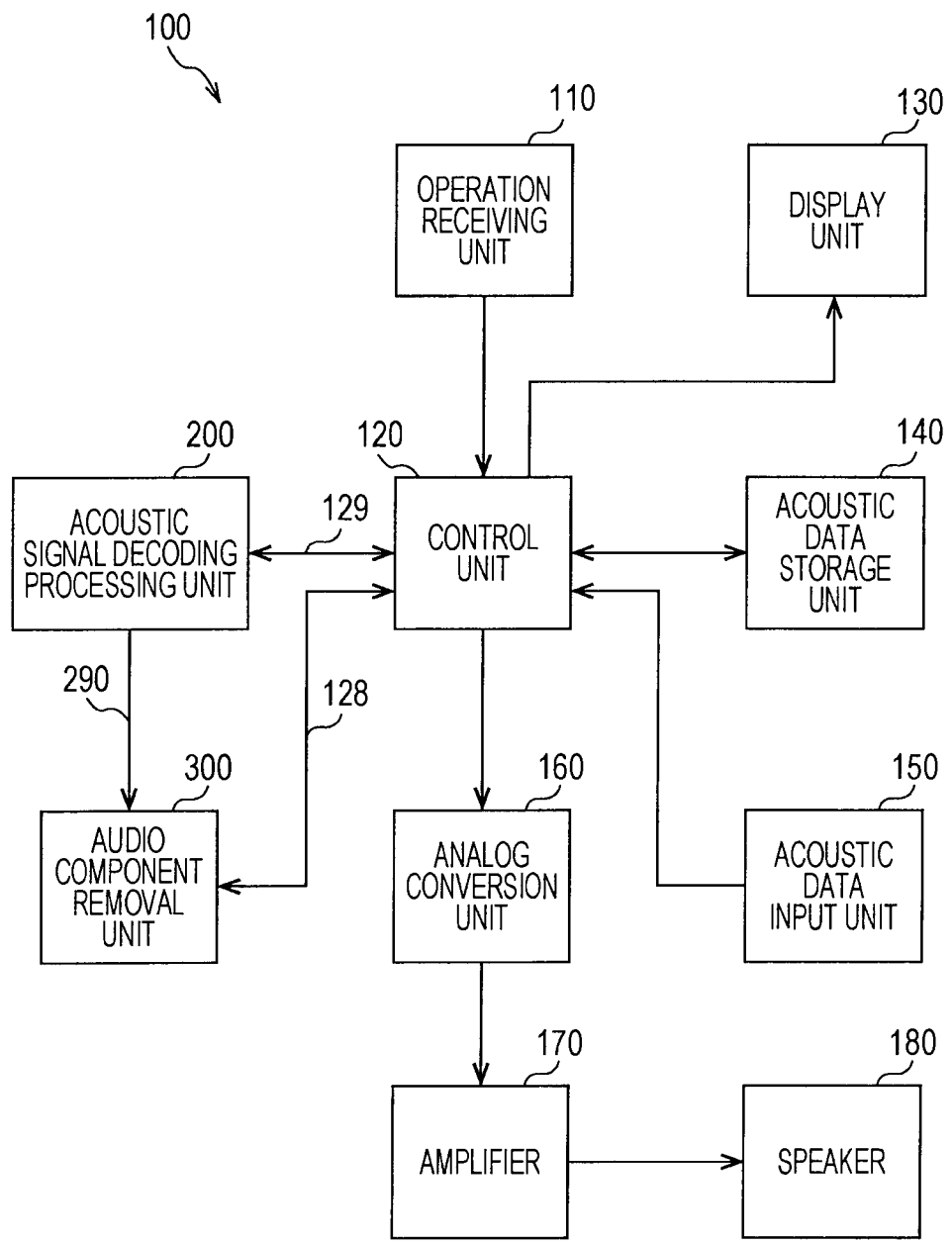
FIG. 1 is a block diagram illustrating an example configuration of a music playback apparatus according to a first embodiment of the present invention.

FIG. 1 is a block diagram illustrating an example configuration of a music playback apparatus according to a first embodiment of the present invention. A music playback apparatus 100 includes an operation receiving unit 110, a control unit 120, a display unit 130, an acoustic data storage unit 140, an acoustic data input unit 150, an analog conversion unit 160, an amplifier 170, and a speaker 180. Note that the music playback apparatus 100 is an example of an acoustic signal processing apparatus recited in the claims.

The operation receiving unit 110 is configured to receive various settings based on an operation of a user who uses the music playback apparatus 100. The operation receiving unit 110 receives, for example, a setting for reproducing any one piece of acoustic data among a plurality of pieces of acoustic data stored in the acoustic data storage unit 140. Further, the operation receiving unit 110 receives a setting of a karaoke function for, when reproducing acoustic data stored in the acoustic data storage unit 140, reducing the audio components included in the acoustic data and outputting the resulting data as an accompaniment signal from the speaker 180. Further, the operation receiving unit 110 generates setting signals on the basis of the received settings, and supplies the setting signals to the control unit 120.

The control unit 120 is configured to control the display unit 130, the acoustic data storage unit 140, the analog conversion unit 160, the acoustic signal decoding processing unit 200, and the audio component removal unit 300 on the basis of the setting signals supplied from the operation receiving unit 110. The control unit 120 causes the acoustic data storage unit 140 to store the acoustic data input from the acoustic data input unit 150 on the basis of the setting signal regarding transfer from the operation receiving unit 110.

The control unit 120 stores the acoustic signal that is a digital signal generated using, for example, PCM (Pulse Code Modulation: pusel code modulation) codes in the acoustic data storage unit 140 as acoustic data. Further, the control unit 120 stores, for example, encoded acoustic data obtained by encoding an acoustic signal in the acoustic data storage unit 140 as acoustic data.

Further, the control unit 120 supplies any one piece of encoded acoustic data among the pieces of acoustic data stored in the acoustic data storage unit 140 to the acoustic signal decoding processing unit 200 on the basis of the setting signal regarding reproduction from the operation receiving unit 110. Further, the control unit 120 supplies the encoded acoustic data sent from the acoustic data input unit 150 to the acoustic signal decoding processing unit 200 on the basis of the setting signal regarding reproduction from the operation receiving unit 110.

Further, the control unit 120 supplies the acoustic signal decoded by the acoustic signal decoding processing unit 200 or the acoustic signal sent from the acoustic data storage unit 140 to the analog conversion unit 160 as a digital signal. Further, the control unit 120 supplies the acoustic signal sent from the acoustic data storage unit 140 to the audio component removal unit 300 on the basis of the setting signal regarding the karaoke function from the operation receiving unit 110. Further, the control unit 120 supplies an accompaniment signal from which the audio components included in the acoustic signal have been removed by the audio component removal unit 300 to the analog conversion unit 160 on the basis of the setting signal regarding the karaoke function from the operation receiving unit 110.

Further, the control unit 120 causes the display unit 130 to display various information regarding the music playback apparatus 100 on the basis of the setting signals from the operation receiving unit 110. The control unit 120 causes the display unit 130 to display, for example, information regarding the acoustic data stored in the acoustic data storage unit 140. The control unit 120 causes the display unit 130 to display, for example, the reproduction status of the acoustic data, the setting status of the karaoke function or the like, and the like.

The display unit 130 is configured to display various information regarding the music playback apparatus 100, which is sent from the control unit 120. The display unit 130 can be implemented by, for example, an LCD (Liquid Crystal Display).

The acoustic data storage unit 140 is configured to store acoustic data supplied from the control unit 120. The acoustic data storage unit 140 stores, as acoustic data, the encoded acoustic data and acoustic signal sent from the acoustic data input unit 150. In addition, the acoustic data storage unit 140 stores the acoustic signal sent from the acoustic signal decoding processing unit 200. Further, the acoustic data storage unit 140 outputs the stored acoustic data to the control unit 120.

The acoustic data input unit 150 is configured to supply acoustic data input from an external device to the control unit 120. The acoustic data input unit 150 supplies, for example, encoded acoustic data or an acoustic signal sent from an external device to the control unit 120.

The analog conversion unit 160 is configured to convert a digital signal that is an acoustic signal supplied from the control unit 120 into an analog signal. The analog conversion unit 160 generates an electrical signal that is an analog signal on the basis of the digital signal that is an acoustic signal. Further, the analog conversion unit 160 supplies the generated electrical signal to the amplifier 170.

The amplifier 170 is configured to amplify the amplitude of the analog signal supplied from the analog conversion unit 160. The amplifier 170 supplies the amplified analog signal to the speaker 180. The speaker 180 is configured to convert the analog signal supplied from the amplifier 170 into an acoustic wave and to output the acoustic wave.

The acoustic signal decoding processing unit 200 is configured to decode the encoded acoustic data sent from the control unit 120. The acoustic signal decoding processing unit 200 supplies the decoded encoded acoustic data as an acoustic signal to the control unit 120 or the audio component removal unit 300 via a signal line 290.

The audio component removal unit 300 is configured to remove the audio components out of the audio components and the accompaniment components included in the acoustic signal sent from the acoustic signal decoding processing unit 200 or the acoustic data storage unit 140 to generate an accompaniment signal composed of the accompaniment components. The audio component removal unit 300 supplies the generated accompaniment signal to the analog conversion unit 160 via the control unit 120.

In this manner, with the provision of the audio component removal unit 300, the music playback apparatus 100 can generate an accompaniment signal in which the audio components included in the acoustic signal are suppressed, on the basis of an acoustic signal sent from the acoustic data storage unit 140 or the acoustic data input unit 150. Here, an example of an acoustic signal encoding apparatus that generates acoustic data supplied from the acoustic data storage unit 140 or the acoustic data input unit 150 will be described hereinafter with reference to the drawings.

[Example Configuration of Acoustic Signal Encoding Apparatus]

Figure 2:
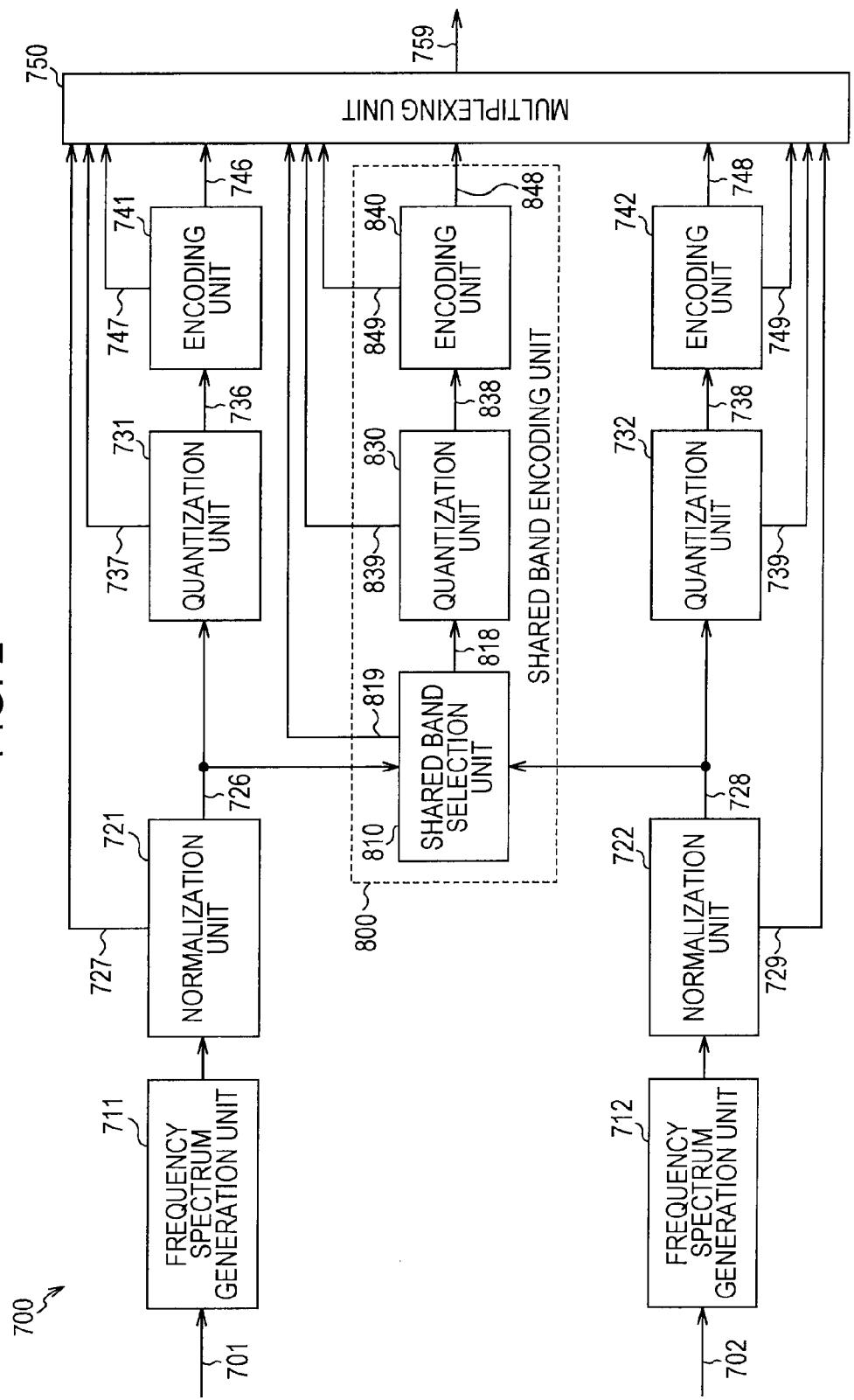
FIG. 2 is a block diagram illustrating a configuration of an existing acoustic signal encoding apparatus.

FIG. 2 is a block diagram illustrating a configuration of an existing acoustic signal encoding apparatus. Here, by way of example, an acoustic signal encoding apparatus 700 that performs an encoding process using the intensity method will be described. The acoustic signal encoding apparatus 700 is configured to encode two-channel acoustic signals input via input lines 701 and 702 and to output the encoded acoustic signals as encoded acoustic data via an output line 759.

The acoustic signal encoding apparatus 700 includes frequency spectrum generation units 711 and 712, normalization units 721 and 722, quantization units 731 and 732, encoding units 741 and 742, a multiplexing unit 750, and a shared band encoding unit 800. Further, the shared band encoding unit 800 includes a shared band selection unit 810, a quantization unit 830, and an encoding unit 840.

The frequency spectrum generation units 711 and 712 are configured to generate frequency spectra by converting the acoustic signals of the respective channels input from the input lines 701 and 702 for the right and left channels into the frequency domain. That is, the frequency spectrum generation units 711 and 712 convert time-domain signals that are the acoustic signals of the respective channels into frequency components.

Specifically, the frequency spectrum generation units 711 and 712 extract acoustic signals, which are discrete-time signals sampled at certain time intervals, in units of a certain number of samples, and generate the extracted time-domain signals as frames. Then, the frequency spectrum generation units 711 and 712 convert the generated frames into the frequency domain to generate frequency spectra.

The frequency spectrum generation units 711 and 712 generate, as frequency spectra, for example, Fourier coefficients calculated by performing a fast Fourier transform (FFT) on the acoustic signals of the respective channels. Alternatively, the frequency spectrum generation units 711 and 712 generate, as frequency spectra, modified discrete cosine transform (MDCT) coefficients calculated through an MDCT. Further, the frequency spectrum generation units 711 and 712 supply the generated frequency spectra indicating the respective frequency components to the normalization units 721 and 722.

The normalization units 721 and 722 are configured to perform normalization on the basis of the levels of the respective frequency spectra supplied from the frequency spectrum generation units 711 and 712. The normalization units 721 and 722 divide the frequency spectra sent from the frequency spectrum generation units 711 and 712 into predetermined frequency bands.

Further, the normalization units 721 and 722 generate normalization reference values (scale factors) in units of the obtained sub-bands (scale factor bands) on the basis of maximum levels of the respective frequency spectra in the sub-bands. Then, the normalization units 721 and 722 normalize the power values based on the amplitude levels of the respective frequency spectra corresponding to the sub-bands on the basis of the normalization reference values of the sub-bands. That is, the normalization units 721 and 722 normalize the power values, which are the levels of the respective frequency spectra, in units of the sub-bands, thereby generating normalized components for the individual sub-bands.

Further, the normalization units 721 and 722 supply normalized values that are the normalized power values to the quantization unit 731, the quantization unit 732, and the shared band selection unit 810 via signal lines 726 and 728. Also, the normalization units 721 and 722 supply the normalization reference values of the individual sub-bands to the multiplexing unit 750 via signal lines 727 and 729 because of the need to decode the encoded acoustic signals.

The quantization units 731 and 732 are configured to quantize, in units of the sub-bands, the normalized values supplied from the normalization units 721 and 722. The quantization units 731 and 732 quantize the normalized power values with the numbers of quantization steps that are set for the individual sub-bands. The quantization units 731 and 732 convert, for example, the normalized power values (0 to 1) into discrete values by certain quantization step widths. That is, the quantization units 731 and 732 quantize the normalized values in units of the sub-bands to generate quantized components for the individual sub-bands.

Further, the quantization units 731 and 732 supply quantized values that are the quantized power values to the encoding units 741 and 742 via signal lines 736 and 738. Also, the quantization units 731 and 732 supply the numbers of quantization steps for the individual sub-bands to the multiplexing unit 750 via signal lines 737 and 739 because of the need to decode the encoded acoustic signals.

The encoding units 741 and 742 are configured to encode, in units of the sub-bands, the quantized values sent from the quantization units 731 and 732 by referring to encoding tables. The encoding units 741 and 742 perform conversion into codes having a predetermined bit length on the basis of the quantized values by referring to, for example, fixed-length or variable-length code books as encoding tables. In this manner, the quantized values are encoded on the basis of encoding tables that are referred to, thus allowing compression of the amount of information of the quantized values.

Further, the encoding units 741 and 742 supply the encoded quantized values to the multiplexing unit 750 as encoded data via signal lines 746 and 748. Also, the encoding units 741 and 742 supply table identification information about the encoding tables that are referred to, in units of the sub-bands, via signal lines 747 and 749 because of the need to decode the encoded acoustic signals.

The shared band encoding unit 800 is configured to perform, when a correlation between the normalized values of the two channels in a sub-band is high, a shared-band encoding process for encoding the normalized value of only one channel in this sub-band. The shared band selection unit 810 selects, as a shared band, a sub-band having a high correlation between the normalized value of the left channel from the normalization unit 721 and the normalized value of the right channel from the normalization unit 722.

The shared band selection unit 810 calculates a correlation level for each sub-band on the basis of the normalized values of the right and left channels, and, in a case where the calculated correlation level exceeds a certain correlation level threshold, selects the normalized value of one channel in this sub-band as the shared band. Further, the shared band selection unit 810 supplies shared-band information indicating the selected shared band to the multiplexing unit 750 via a signal line 819.

Further, the shared band selection unit 810 supplies the normalized value of one channel in the selected shared band to the quantization unit 830 via a signal line 818. For example, the shared band selection unit 810 supplies the normalized value of the left channel in the selected shared band to the quantization unit 830.

The quantization unit 830 is configured to quantize the normalized value supplied from the shared band selection unit 810. The function of the quantization unit 830 is similar to that of the quantization units 731 and 732, and a detailed description thereof is thus omitted here. The quantization unit 830 supplies the number of quantization steps to the multiplexing unit 750 via a signal line 839, and also supplies the quantized value to the encoding unit 840 via a signal line 838.

The encoding unit 840 is configured to encode the quantized value supplied from the quantization unit 830. The function of the encoding unit 840 is similar to that of the encoding units 741 and 742, and a detailed description thereof is thus omitted here. The encoding unit 840 supplies the table identification information to the multiplexing unit 750 via a signal line 849, and also supplies encoded data to the multiplexing unit 750 via a signal line 848.

The multiplexing unit 750 is configured to multiplex the data supplied from the normalization units 721 and 722, the shared band selection unit 810, the quantization units 731, 732, and 830, and the encoding units 741, 742, and 840 into one code string. The multiplexing unit 750 multiplexes the normalization reference values, the numbers of quantization steps, the table identification information, and the encoded data of the two channels, and the shared-band information, the normalization reference value, the number of quantization steps, the table identification information, and the encoded data sent from the shared band encoding unit 800. That is, the multiplexing unit 750 multiplexes the above pieces of data by time division to generate one code string (bit stream).

Further, the multiplexing unit 750 excludes, for example, based on the shared-band information supplied from the shared band selection unit 810, the data sent from the quantization units 731 and 732 and the encoding units 741 and 742 in the sub-band corresponding to the shared-band information from the object of multiplexing. This allows multiplexing of the encoded data obtained by encoding, among the frequency spectra of the two channels, only the frequency spectrum of one channel in a sub-band having a high correlation.

Further, the multiplexing unit 750 outputs the generated code string to the output line 759 as encoded acoustic data. The multiplexing unit 750 supplies the encoded acoustic data via the output line 759 to, for example, the acoustic data input unit 150 illustrated in FIG. 1. The multiplexing unit 750 also supplies the encoded acoustic data via the output line 759 to, for example, an external storage device or the like.

In this manner, the acoustic signal encoding apparatus 700 is provided with the shared band encoding unit 800 to multiplex only encoded data of one channel among encoded data of two channels in a sub-band having a high correlation, thereby reducing the amount of encoded acoustic data. Here, a frequency spectrum in sub-bands, which is divided by the normalization units 721 and 722, will be briefly described hereinafter with reference to the drawings.

[Example of Division of Frequency Band with Respect to Frequency Components of Acoustic Signal]

Figure 3:
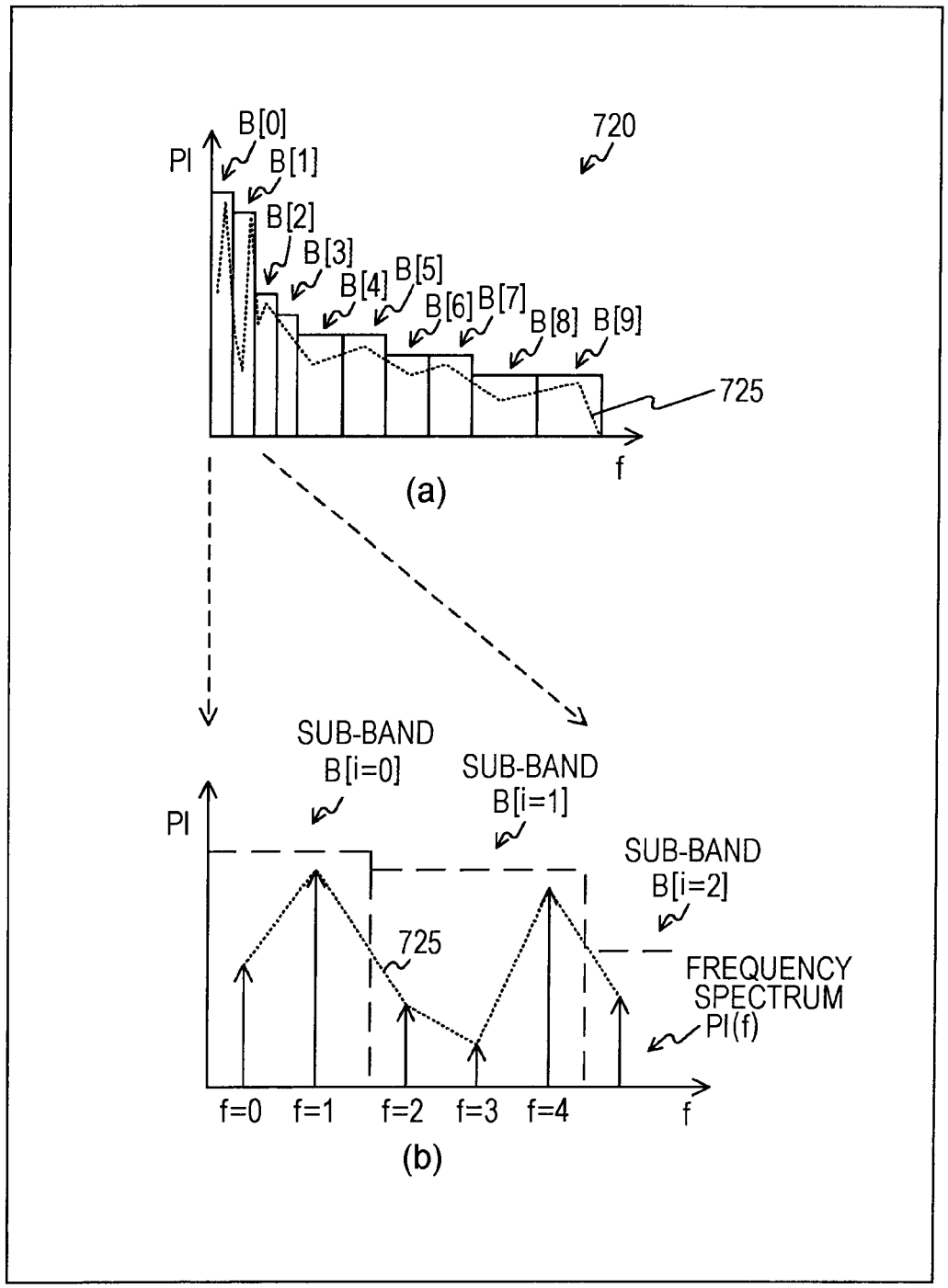
FIG. 3 includes conceptual diagrams illustrating an example regarding a frequency spectrum divided by normalization units 721 and 722.

FIG. 3 includes conceptual diagrams illustrating an example regarding a frequency spectrum divided by the normalization units 721 and 722. Part (a) of FIG. 3 is a conceptual diagram illustrating sub-bands into which the frequency spectrum of the frequency components of the acoustic signal is divided by predetermined bands by the normalization unit 721 of the left channel. Part (b) of FIG. 3 is a conceptual diagram illustrating the frequency spectrum in the sub-bands illustrated in part (a) of FIG. 3.

In part (a) of FIG. 3, as left-channel acoustic signal components 720, an envelope 725 of the left-channel frequency spectrum generated by the frequency spectrum generation unit 711 and nine sub-bands B[0] to B[9] are illustrated. Here, the vertical axis represents power Pl of frequency components in the left channel, and the horizontal axis represents frequency spectrum number (index) f corresponding to frequency.

The sub-bands B[0] to B[9] indicate frequency bands obtained by dividing the frequency spectrum generated by the frequency spectrum generation unit 711 into nine segments by using the normalization unit 721. The levels (heights) of the sub-bands B[0] to B[9] indicate the normalization reference values (scale factors) calculated on the basis of maximum levels of the frequency spectrum in the sub-bands. Note that, here, an example of setting the sub-bands, by taking into account high human auditory sensitivity to frequency components in the low-frequency region, so that sub-bands in the low-frequency region become narrow while wider sub-bands are provided in a higher frequency region is illustrated.

In part (b) of FIG. 3, the levels Pl(f) of the 0th to fourth frequency spectra included in the sub-bands B[0] and B[1] are illustrated. The level Pl(f) of those frequency spectra indicates a power value calculated on the basis of the amplitude level of the frequency spectrum of number f. For example, the level Pl(f) is a value calculated on the basis of the square of the Fourier coefficient of number f. Note that, here, the indices of the sub-bands B are represented by [i].

In this manner, when the acoustic signal encoding apparatus 700 encodes an acoustic signal, encoding is performed by associating a plurality of frequency spectra f with each sub-band B[i]. Next, an example configuration of the acoustic signal decoding processing unit 200 that decodes the encoded acoustic data generated by the acoustic signal encoding apparatus 700 will be described hereinafter with reference to the drawings.

[Example Configuration of Acoustic Signal Decoding Processing Unit 200]

Figure 4:
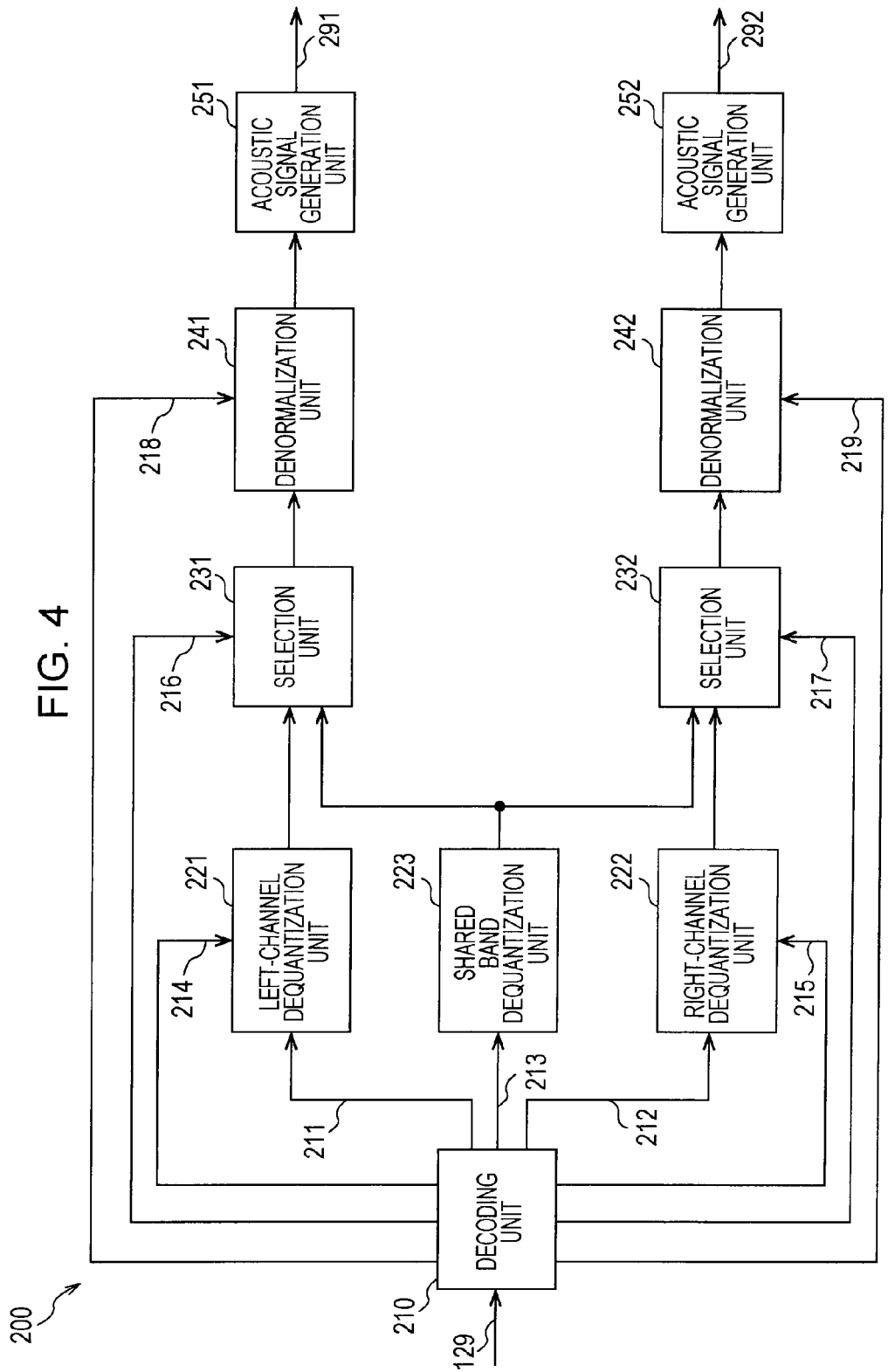
FIG. 4 is a block diagram illustrating an example configuration of an acoustic signal decoding processing unit 200 according to the first embodiment of the present invention.

FIG. 4 is a block diagram illustrating an example configuration of the acoustic signal decoding processing unit 200 according to the first embodiment of the present invention. The acoustic signal decoding processing unit 200 includes a decoding unit 210, a left-channel dequantization unit 221, a right-channel dequantization unit 222, a shared band dequantization unit 223, selection units 231 and 232, denormalization units 241 and 242, and acoustic signal generation units 251 and 252.

The decoding unit 210 is configured to decode encoded acoustic data that is a code string supplied from a signal line 129. The decoding unit 210 separates the encoded acoustic data into normalization reference values, the numbers of quantization steps, table identification information, and encoded data of the respective channels. Further, the decoding unit 210 extracts the encoded data and the table identification information from the separated encoded acoustic data, and refers to a decoding table specified by the extracted table identification information to decode the encoded data into a quantized value.

Further, the decoding unit 210 supplies the numbers of quantization steps of the left and right channels within the separated encoded acoustic data to the left-channel dequantization unit 221 and the right-channel dequantization unit 222 via signal lines 214 and 215, respectively. Also, the decoding unit 210 supplies the quantized values of the right channel and the left channel for individual sub-bands to the left-channel dequantization unit 221 and the right-channel dequantization unit 222 via signal lines 211 and 212, respectively.

Further, the decoding unit 210 supplies the quantized value of the shared band specified by the shared-band information and the corresponding number of quantization steps within the separated encoded acoustic data to the shared band dequantization unit 223 via a signal line 213. Further, the decoding unit 210 supplies, to the selection units 231 and 232 via signal lines 216 and 217, selection signals for selecting the output from the shared band dequantization unit 223 on the basis of the shared-band information within the separated encoded acoustic data. That is, the decoding unit 210 simultaneously supplies the output corresponding to the shared band from the shared band dequantization unit 223 to the denormalization units 241 and 242 of both channels.

Further, the decoding unit 210 supplies, for each sub-band, the normalization reference values of the and right channels within the separated encoded acoustic data to the denormalization units 241 and 242 via signal lines 218 and 219, respectively.

The left- and right-channel dequantization units 221 and 222 are configured to dequantize, for each sub-band, the quantized values on the basis of the numbers of quantization steps. The left- and right-channel dequantization units 221 and 222 generate, the quantized values for each sub-band from the signal lines 211 and 212, normalized values of the respective channels on the basis of the numbers of quantization steps sent from the signal lines 214 and 215.

That is, the left-channel dequantization unit 221 generates, the quantized value of the left channel from the signal line 211, a normalized value of the left channel on the basis of the number of quantization steps sent from the signal line 214.

The right-channel dequantization unit 222 generates, the quantized value of the right channel from the signal line 212, a normalized value of the right channel on the basis of the number of quantization steps sent from the signal line 215.

Further, the left- and right-channel dequantization units 221 and 222 supply the generated normalized values of the respective channels to the denormalization units 241 and 242 via the selection units 231 and 232, respectively.

The shared band dequantization unit 223 is configured to dequantize the quantized value in the shared band specified by the shared-band information on the basis of the corresponding number of quantization steps. The shared band dequantization unit 223 generates a normalized value in the shared band on the basis of the quantized value and the number of quantization steps supplied from the signal line 213. The shared band dequantization unit 223 supplies the generated normalized value to the denormalization units 241 and 242 via the selection units 231 and 232, respectively.

The selection units 231 and 232 are configured to select the normalized value in the shared band or the normalized value in a sub-band other than the shared band on the basis of the selection signal sent from the decoding unit 210, and to output the selected normalized value to the denormalization units 241 and 242. For example, in a case where the normalized value corresponding to the shared band is supplied from the shared band dequantization unit 223, the selection units 231 and 232 output a normalized value corresponding to the same shared band to both the denormalization units 241 and 242 on the basis of the selection signal sent from the decoding unit 210.

On the other hand, in a case where the normalized values are supplied from the left- and right-channel dequantization units 221 and 222, the selection units 231 and 232 output the normalized values of the respective channels to the denormalization units 241 and 242 on the basis of the selection signal sent from the decoding unit 210.

The denormalization units 241 and 242 are configured to denormalize, for each sub-band, the normalized values on the basis of the normalization reference values. The denormalization units 241 and 242 generate, the normalized values for each sub-band from the selection units 231 and 232, frequency spectra of the respective channels using the normalization reference values from the signal lines 218 and 219.

That is, the left-channel dequantization unit 221 generates the power values of the frequency spectrum of the left channel on the basis of the normalized value sent from the selection unit 231 and the normalization reference value sent from the signal line 218. Further, the right-channel dequantization unit 222 generates the power values of the frequency spectrum of the right channel on the basis of the normalized value sent from the selection unit 232 and the normalization reference value sent from the signal line 219. Further, the denormalization units 241 and 242 supply the generated frequency spectra of the respective channels to the acoustic signal generation units 251 and 252, respectively.

The acoustic signal generation units 251 and 252 are configured to generate acoustic signals of the respective channels on the basis of the frequency spectra of the respective channels supplied from the denormalization units 241 and 242. That is, the acoustic signal generation units 251 and 252 convert the frequency spectra that are frequency-domain data into acoustic signals that are time-domain signals. The acoustic signal generation units 251 and 252 restore time-domain signals on a frame-by-frame basis by, for example, performing an inverse fast Fourier transform (IFFT: Inverse FFT) on the frequency spectra of the respective channels. Alternatively, the acoustic signal generation units 251 and 252 restore time-domain signals on a frame-by-frame basis through an inverse modified discrete cosine transform (IMDCT: Inverse MDCT).

Further, the acoustic signal generation units 251 and 252 supply the generated acoustic signals of the respective channels to left- and right-channel signal lines 291 and 292, respectively. That is, the acoustic signal generation units 251 and 252 supply the acoustic signals of the right channel and the left channel to the audio component removal unit 300. Note that, in an embodiment of the present invention, an acoustic signal generated by decoding an encoded acoustic signals by using the acoustic signal generation units 251 and 252 or the like is referred to as a compressed signal.

In this manner, with the provision of the shared band dequantization unit 223 and the selection units 231 and 232, the acoustic signal decoding processing unit 200 can decode encoded acoustic data encoded by the acoustic signal encoding unit 700. Note that for a shared band in which the normalization reference values of both channels are equal among shared bands in the acoustic signals of both channels decoded by the acoustic signal decoding processing unit 200, the frequency distributions in this shared band are substantially equal.

Note that, here, an example configuration of the acoustic signal decoding processing unit 200 that decodes acoustic signals of two channels has been described; however, the description is not to be construed in a limiting sense, and acoustic signals of three or more channels may be decoded. Next, an example configuration of the audio component removal unit 300 that reduces audio components included in an acoustic signal supplied from the acoustic signal decoding processing unit 200 or the control unit 120 will be described with reference to the drawings.

[Example Configuration of Audio Component Removal Unit 300]

Figure 5:
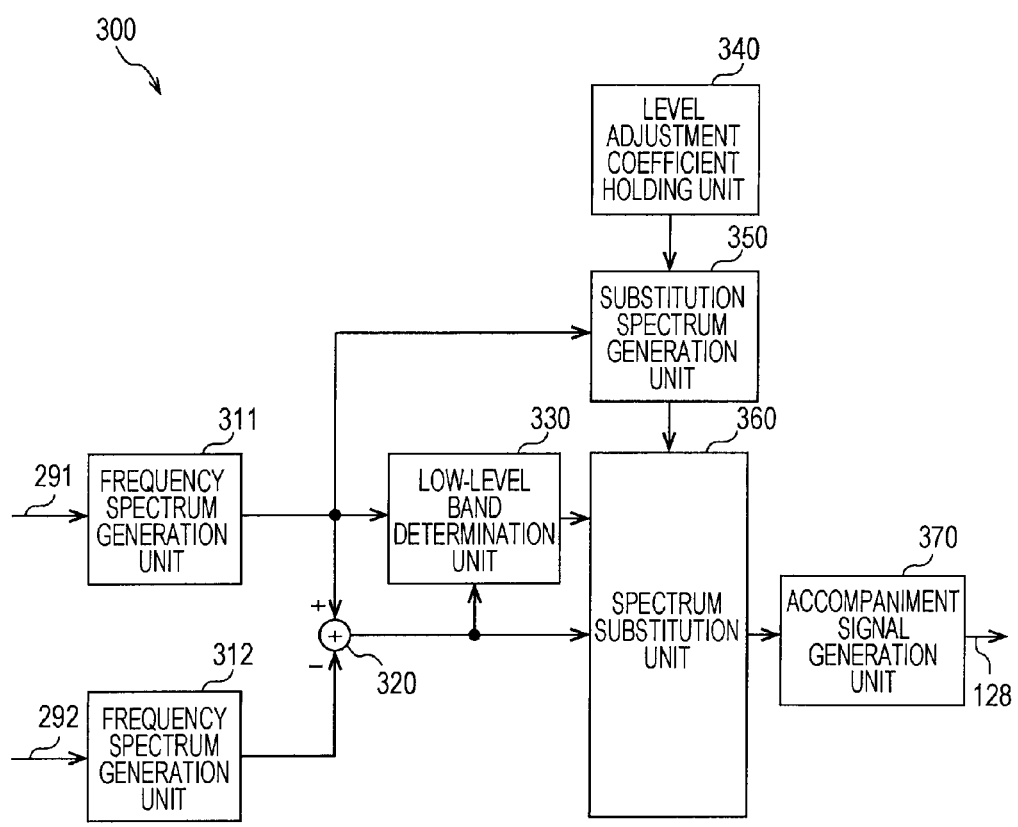
FIG. 5 is a block diagram illustrating an example configuration of an audio component removal unit 300 according to the first embodiment of the present invention.

FIG. 5 is a block diagram illustrating an example configuration of the audio component removal unit 300 according to the first embodiment of the present invention. The audio component removal unit 300 reduces audio components in acoustic signals of the respective channels supplied from the acoustic signal decoding processing unit 200 via the left- and right-channel signal lines 291 and 292 included in the signal line 290, and outputs a resulting signal as an accompaniment signal.

Further, here, it is assumed that acoustic signals of two channels including substantially equal frequency distributions of audio components among a plurality of acoustic signals of two or more channels are supplied from the left- and right-channel signal lines 291 and 292.

The audio component removal unit 300 includes frequency spectrum generation units 311 and 312, a difference spectrum calculation unit 320, a low-level band determination unit 330, a level adjustment coefficient holding unit 340, and a substitution spectrum generation unit 350. In addition, the audio component removal unit 300 includes a spectrum substitution unit 360 and an accompaniment signal generation unit 370.

The frequency spectrum generation units 311 and 312 are configured to generate frequency spectra by converting acoustic signals of the respective channels sent from the left- and right-channel signal lines 291 and 292 into frequency components. The function of the frequency spectrum generation units 311 and 312 is similar to that of the frequency spectrum generation units 711 and 712 illustrated in FIG. 2, and a detailed description thereof is thus omitted here.

The frequency spectrum generation unit 311 supplies the individual generated frequency spectra indicating the frequency components of the left channel to the difference spectrum calculation unit 320, the low-level band determination unit 330, and the substitution spectrum generation unit 350. Further, the frequency spectrum generation unit 312 supplies the individual generated frequency spectra of the right channel to the difference spectrum calculation unit 320.

The difference spectrum calculation unit 320 is a calculation unit that calculates, as a difference spectrum, the absolute difference value between the levels of the frequency spectra corresponding to the same frequency from the frequency spectrum generation units 311 and 312. That is, the difference spectrum calculation unit 320 calculates, as a difference spectrum, the difference between frequency spectra of acoustic signals of two channels including substantially equal frequency distributions of audio components among acoustic signals of a plurality of channels. In this manner, the difference between the frequency spectrum of the right channel and the frequency spectrum of the left channel is calculated and therefore audio components in acoustic signals can be reduced.

The difference spectrum calculation unit 320 calculates, as the power values of a difference spectrum, the absolute values of subtraction values obtained by subtracting the power values of the frequency spectrum of the right channel from the power values that are the levels of the frequency spectrum of the left channel. For example, the difference spectrum calculation unit 320 subtracts the power value of the frequency spectrum of number 0 in the right channel from the power value of the frequency spectrum of number 0 in the left channel, thereby calculating the absolute difference value therebetween as a difference spectrum of number 0.

Further, the difference spectrum calculation unit 320 supplies the calculated difference spectrum to the low-level band determination unit 330 and the spectrum substitution unit 360. Note that the difference spectrum calculation unit 320 is an example of a difference spectrum calculation unit recited in the claims.

The low-level band determination unit 330 is configured to determine a frequency band, in which a level drops rapidly in an envelope of difference spectra calculated by the difference spectrum calculation unit 320, to be a low-level band. The low-level band determination unit 330 compares the level of each of the difference spectra with a low-level threshold for specifying a frequency band in which a level drops rapidly in the envelope of the frequency spectrum.

For example, the low-level band determination unit 330 compares the power values based on the amplitude levels of all the difference spectra with a low-level threshold set in advance. As another example, the low-level band determination unit 330 sets a low-level threshold on the basis of a level of the frequency spectrum of the left channel corresponding to a difference spectrum to be compared, and compares the difference spectrum with the set low-level threshold. In this example, the low-level band determination unit 330 may use an average value, a global envelope, or the like in the frequency spectrum of the left channel.

Further, the low-level band determination unit 330 determines, for each difference spectrum, whether or not the level of the difference spectrum is less than the low-level threshold on the basis of the comparison result. Then, the low-level band determination unit 330 determines a difference spectrum less than the low-level threshold to be a low-level band. That is, for example, in a case where the difference between the low-level threshold and the level of a difference spectrum exceeds a certain condition, the low-level band determination unit 330 determines that the difference spectrum is a low-level band.

Further, the low-level band determination unit 330 generates substitution information for each difference spectrum in order to substitute the difference spectrum determined to be a low-level band for another spectrum. For example, the low-level band determination unit 330 generates substitution information indicating true (TRUE) in the case of determining a low-level band, and generates substitution information indicating false (False) in the case of determining a non-low-level band.

Further, the low-level band determination unit 330 supplies the generated substitution information to the spectrum substitution unit 360. Note that the low-level band determination unit 330 is an example of a low-level band determination unit recited in the claims.

The substitution spectrum generation unit 350 is configured to generate a substitution spectrum for substituting, in a case where a difference spectrum is determined to be a low-level band, the component of the difference spectrum for another component, on the basis of the frequency spectrum of the left channel corresponding to the difference spectrum. That is, the substitution spectrum generation unit 350 generates a substitution spectrum for which a difference spectrum is substituted, on the basis of at least one of the frequency spectra of the two channels.

The substitution spectrum generation unit 350 generates a substitution spectrum on the basis of, for example, the frequency spectrum of the left channel and a predetermined level adjustment coefficient held in the level adjustment coefficient holding unit 340. The substitution spectrum generation unit 350 generates, as the level of a substitution spectrum, the multiplication of value of the frequency spectrum of the left channel and the level adjustment coefficient corresponding to the frequency spectrum.

Further, the substitution spectrum generation unit 350 supplies the generated substitution spectrum to the spectrum substitution unit 360. Note that the substitution spectrum generation unit 350 is an example of a substitution spectrum generation unit recited in the claims.

The level adjustment coefficient holding unit 340 is configured to hold a level adjustment coefficient for adjusting a level of the substitution spectrum. The level adjustment coefficient holding unit 340 holds, for example, a level adjustment coefficient determined in advance. In this case, the level adjustment coefficient holding unit 340 holds, for example, a level adjustment coefficient for which a level adjustment coefficient corresponding to the audio band has a smaller value than a level adjustment coefficient corresponding to a band other than the audio band. That is, the substitution spectrum generation unit 350 generates a substitution spectrum on the basis of a level adjustment coefficient of the audio band which is smaller than a level adjustment coefficient corresponding to a band other than the audio band and on the basis of the frequency spectrum of the left channel. Further, the level adjustment coefficient holding unit 340 outputs the held level adjustment coefficient to the substitution spectrum generation unit 350.

The spectrum substitution unit 360 is configured to substitute a difference spectrum corresponding to a low-level band among individual difference spectra calculated by the difference spectrum calculation unit 320 for a substitution spectrum. The spectrum substitution unit 360 substitutes, based on the substitution information from the low-level band determination unit 330, the difference spectrum sent from the difference spectrum calculation unit 320 for the substitution spectrum sent from the substitution spectrum generation unit 350.

Specifically, the spectrum substitution unit 360 converts the level of a difference spectrum determined to be a low-level band into the level of a substitution spectrum corresponding to the difference spectrum. For example, in a case where substitution information corresponding to the difference spectrum of number 1 indicates true (TRUE), the spectrum substitution unit 360 substitutes a substitution spectrum generated on the basis of the frequency spectrum of number 1 in the left channel for a new difference spectrum of number 1.

Further, the spectrum substitution unit 360 substitutes the level of a difference spectrum determined to be a low-level band for the level of a substitution spectrum corresponding to the difference spectrum, and outputs the resulting spectrum to the accompaniment signal generation unit 370. On the other hand, the spectrum substitution unit 360 outputs the level of a difference spectrum determined not to be a low-level band as it is to the accompaniment signal generation unit 370. Note that the spectrum substitution unit 360 is an example of a spectrum substitution unit recited in the claims.

The accompaniment signal generation unit 370 is configured to generate an accompaniment signal by converting the frequency spectrum in all the frequency bands output from the spectrum substitution unit 360 into a time-domain signal. The accompaniment signal generation unit 370 converts frequency-domain data that is a frequency spectrum indicating frequency components output from the spectrum substitution unit 360 into an accompaniment signal that is a time-domain signal.

The accompaniment signal generation unit 370 restores a time-domain signal on a frame-by-frame basis by, for example, performing an inverse fast Fourier transform on the frequency spectrum. As another example, the accompaniment signal generation unit 370 restores a time-domain signal on a frame-by-frame basis through an inverse modified discrete cosine transform.

Further, the accompaniment signal generation unit 370 outputs the generated accompaniment signal to a signal line 128. That is, the accompaniment signal generation unit 370 supplies the accompaniment signal to the control unit 120, and outputs it from the speaker 180 as accompaniment sound. Note that the accompaniment signal generation unit 370 is an example of an accompaniment signal generation unit recited in the claims.

In this manner, with the provision of the low-level band determination unit 330, a difference spectrum corresponding to a low-level band can be determined among difference spectra calculated by the difference spectrum calculation unit 320. Further, with the provision of the substitution spectrum generation unit 350, a substitution spectrum can be generated on the basis of a frequency spectrum of the left channel having approximate frequency characteristics of a difference spectrum. Thus, a substitution spectrum having frequency characteristics that approximate those of the true difference spectrum can be generated, and therefore correction to a more natural difference spectrum can be achieved.

Further, with the provision of the spectrum substitution unit 360, the level of a frequency spectrum in a low-level band can be substituted for the level of a substitution spectrum generated by the substitution spectrum generation unit 350. Here, a difference spectrum calculated by the difference spectrum calculation unit 320 will be described hereinafter with reference to the drawings.

[Example of Frequency Distribution of Acoustic Signal by Difference Spectrum Calculation Unit 320]

Figure 6:
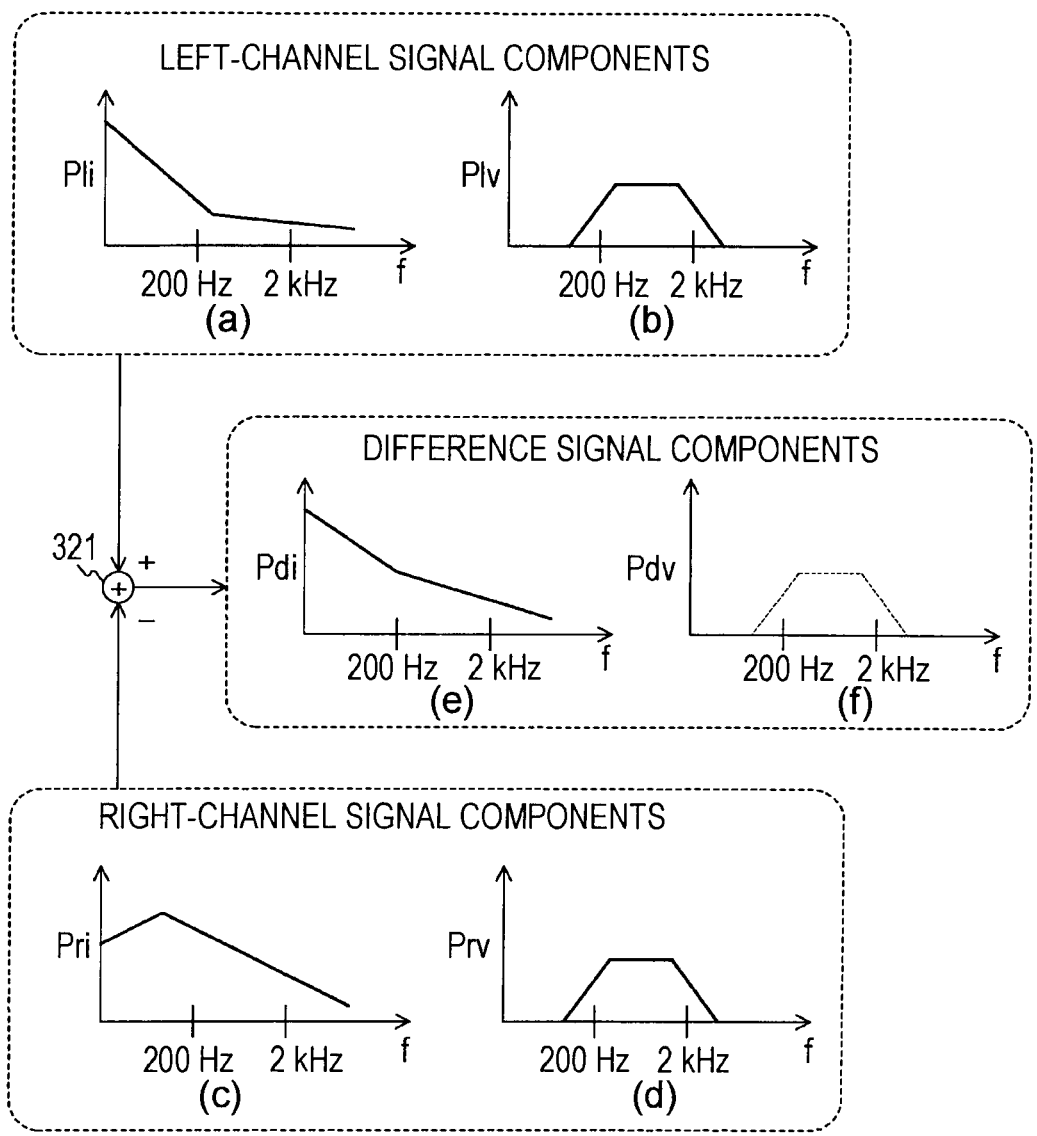
FIG. 6 includes conceptual diagrams illustrating an example of a frequency distribution of audio components and accompaniment components in a difference signal generated on the basis of the difference between acoustic signals in left and right channels.

FIG. 6 includes conceptual diagrams illustrating an example of a frequency distribution of audio components and accompaniment components in a difference signal generated on the basis of the difference between acoustic signals in left and right channels. Here, it is assumed that a difference signal is generated by performing subtraction, using a subtraction unit 321, on a stereo signal having acoustic signals of the right and left channels in which vocal sound is located in the center and in which the locations of pieces of instrumental sound in accompaniment are dispersed.

Parts (a) and (b) of FIG. 6 are diagrams illustrating frequency distributions of, as left-channel signal components, audio components and accompaniment components included in a left-channel acoustic signal. Parts (c) and (d) of FIG. 6 are diagrams illustrating frequency distributions of, as right-channel signal components, audio components and accompaniment components in a right-channel acoustic signal. Further, in parts (a) to (d) of FIG. 6, the vertical axis represents power and the horizontal axis represents frequency.

In part (a) of FIG. 6, accompaniment components Pli included in the left-channel acoustic signal are illustrated. The accompaniment components Pli of the left channel exhibit a large power distribution mainly in a frequency band less than or equal to 200 Hz. In part (b) of FIG. 6, audio components Plv included in the left-channel acoustic signal are illustrated. The audio components Plv of the left channel exhibit a large power distribution mainly in a frequency band of 200 Hz to 2 KHz.

In part (c) of FIG. 6, accompaniment components Pri included in the right-channel acoustic signal are illustrated. The accompaniment components Pri of the right channel exhibit a large power distribution mainly in a frequency band less than or equal to 200 Hz, which is different from the frequency distribution of the accompaniment components Pli of the left channel. In part (d) of FIG. 6, audio components Prv included in the right-channel acoustic signal are illustrated. The audio components Prv of the right channel exhibit a large power distribution in a frequency band of 200 Hz to 2 KHz, which is equal to the frequency distribution of the audio components Plv of the left channel.

In this manner, in a stereo signal in which vocal sound is located in the center, the audio components of the left channel and the audio components of the right channel exhibit substantially equal frequency distributions. In contrast, the accompaniment components tend to exhibit different frequency distributions in the left channel and the right channel because the locations of pieces of instrumental sound are spatially dispersed.

Parts (e) and (f) of FIG. 6 are diagrams illustrating frequency distributions of audio components and accompaniment components included in a difference signal generated by the absolute difference value between the right- and left-channel acoustic signals illustrated in parts (a) to (d) of FIG. 6. Here, the verticals axis represents power and the horizontal axis represents frequency.

In part (e) of FIG. 6, accompaniment components Pdi included in the difference signal are illustrated. In the accompaniment components Pdi of the difference signal, since the frequency distributions of the accompaniment components Pli and Pri of the right and left channels are different, the degree of cancellation between the frequency components of both channels is small.

In part (f) of FIG. 6, audio components Pdv included in the difference signal are illustrated. Further, here, the frequency distribution of the audio components Plv or Prv of the right or left channel is indicated by a broken line. Since the frequency distributions of the audio components Plv and Prv of the right and left channels are equal to each other, the audio components Pdv in the difference signal are canceled by the frequency components of both channels.

In this manner, in two-channel acoustic signals in which vocal sound is located in the center, an accompaniment signal with the audio components suppressed can be generated by subtracting an acoustic signal of one channel from an acoustic signal of the other channel. Note that, here, a difference signal generated in the time domain has been described; however, audio components are also suppressed in a similar manner in a case where after two-channel acoustic signals are converted into frequency spectra, a difference signal is generated on the basis of a difference spectrum calculated by the absolute difference value therebetween. That is, in two-channel acoustic signals including audio components that exhibit substantially equal frequency distributions, a difference spectrum calculated by the difference between the frequency spectra thereof is converted into a time-domain signal, thus allowing the generation of a difference signal with the audio components suppressed.

However, if a difference signal is generated on the basis of an acoustic signal after compression, which is obtained by decoding an acoustic signal compressed by the acoustic signal encoding apparatus 700 illustrated in FIG. 2 or the like, a low-level band in which the amplitude level is extremely low may occur in the frequency components of the difference signal. The occurrence of such a low-level band in the difference signal appears as unpleasant noise in the human auditory sense. Here, the reason of the occurrence of a low-level band that occurs in a difference signal generated on the basis of a compressed signal that is an acoustic signal after compression, which has been decoded, will be described hereinafter with reference to the drawings.

[Example of Occurrence of Low-Level Band due to Quantization Error]

Figure 7:
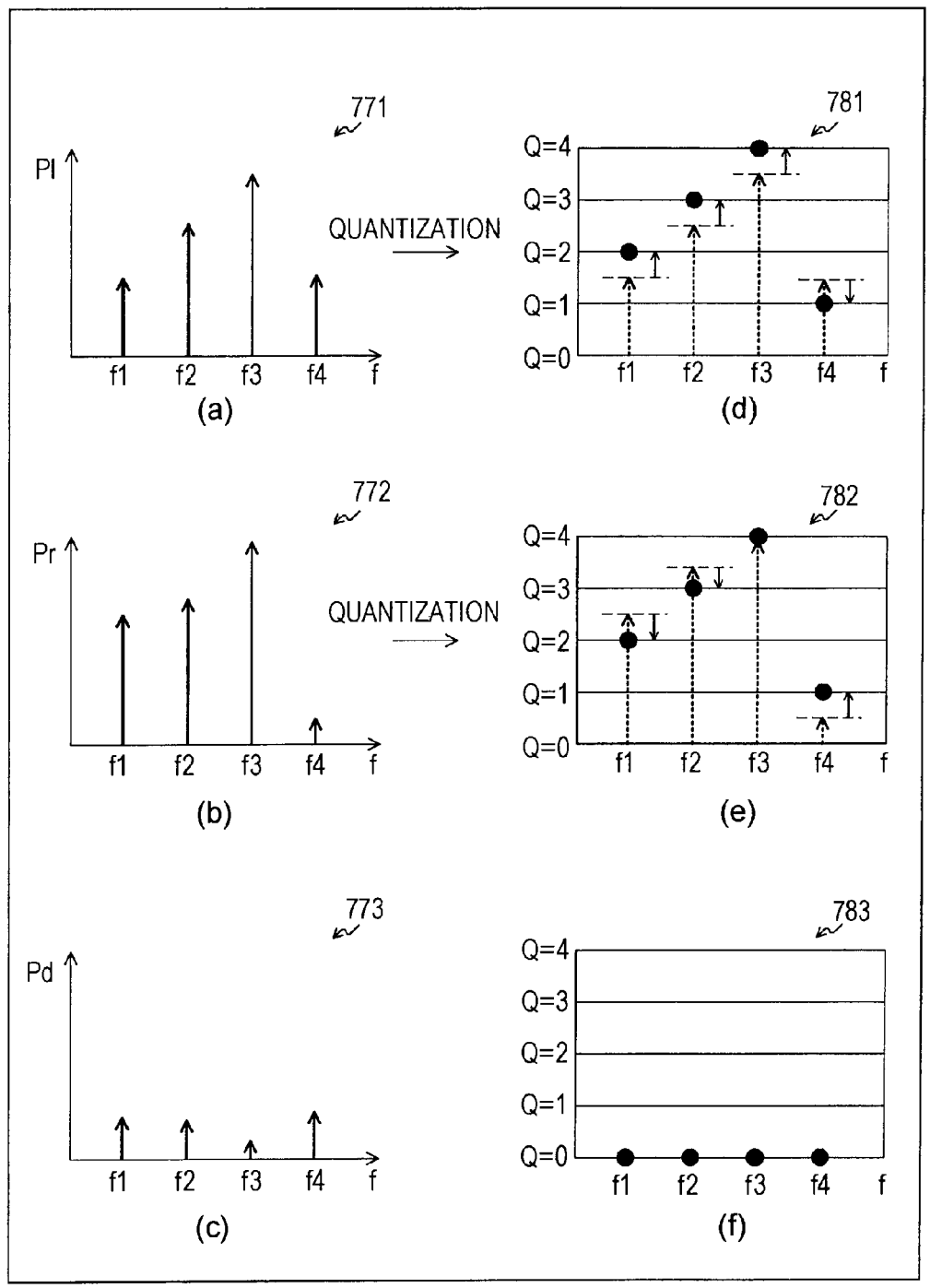
FIG. 7 includes diagrams regarding a low-level band caused due to quantization by quantization units 731 and 732 in an acoustic signal encoding apparatus 700.

FIG. 7 includes diagrams regarding a low-level band caused due to quantization by the quantization units 731 and 732 in the acoustic signal encoding apparatus 700. Parts (a) and (b) of FIG. 7 are diagrams illustrating an example of left normalized components 771 and right normalized components 772 generated by the normalization units 721 and 722 in the acoustic signal encoding apparatus 700, respectively. Part (c) of FIG. 7 is a diagram illustrating normalized absolute difference values 773 that are the absolute difference values between the left normalized components 771 and the right normalized components 772.

Parts (d) and (e) of FIG. 7 are diagrams illustrating an example of left quantized components 781 and right quantized components 782 obtained by quantizing the left normalized components 771 and the right normalized components 772 by using the quantization units 731 and 732 in the acoustic signal encoding apparatus 700, respectively. Part (f) of FIG. 7 is a diagram illustrating quantized absolute difference values 783 that are the absolute difference values between the left quantized components 781 and the right quantized components 782.

In part (a) of FIG. 7, normalized values Pl of four frequency spectra (f1 to f4) included in the sub-band B[i] of number i in the left channel are illustrated. In part (b) of FIG. 7, normalized values Pr of four frequency spectra (f1 to f4) included in the sub-band B[i] of number i in the right channel are illustrated.

In part (c) of FIG. 7, absolute difference values Pd between the normalized values of the frequency spectra (f1 to f4) in the right and left channels are illustrated. The absolute difference values Pd of the frequency spectra (f1 to f4) exhibit different levels.

In part (d) of FIG. 7, quantized values Q of four frequency spectra (f1 to f4) included in the sub-band B[i] of number i in the left channel are illustrated. For example, for the frequency spectrum of number f1, the quantized value Q is set to "2" by quantizing the normalized value.

In part (e) of FIG. 7, quantized values Q of four frequency spectra (f1 to f4) included in the sub-band B[i] of number i in the right channel are illustrated. For example, for the frequency spectrum of number f1, the quantized value Q is set to "2", which is the same as that in the left channel, by quantizing the normalized value.

In part (f) of FIG. 7, absolute difference values Q of quantized values of the same frequency spectra (f1 to f4) in the right and left channels are illustrated. Unlike the absolute difference values 773 illustrated in part (c) of FIG. 7, all the absolute difference values Q of the frequency spectra (f1 to f4) become "0". This is because the quantization of the normalized values of the respective channels limits the normalized values of the frequency spectra (f1 to f4) to five quantized values Q (0 to 4). That is, due to the quantization error caused by quantization, all the quantized absolute difference values Q of the frequency spectra (f1 to f4) in the sub-band B[i] of number i become "0".

In this manner, even if the normalized components 771 and 7772 generated by the normalization units 721 and 722 are different from each other, quantized values of the right and left channels may be made the same by the quantization by the quantization units 731 and 732. In this case, when the normalization reference values corresponding to the sub-band B[i] of number i where the quantized values of both channels are made the same match each other, the frequency band corresponding to the sub-band B[i] of number i is set as a low-level band in the difference signal.

[Example of Occurrence of Low-Level Band Due to Shared-Band Encoding]

Figure 8:
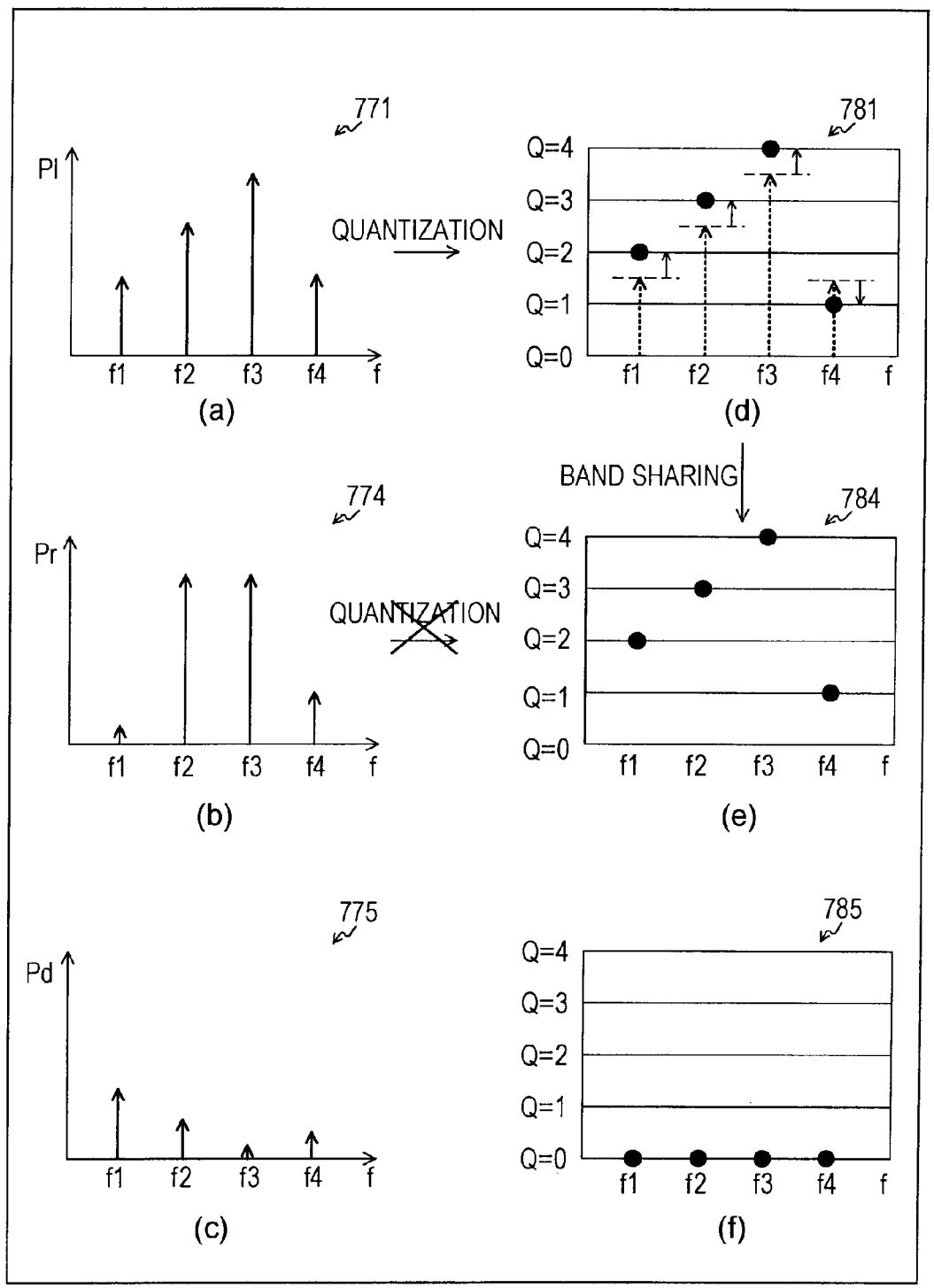
FIG. 8 includes diagrams regarding a low-level band caused due to a shared-band encoding process by a shared band encoding unit 800 in the acoustic signal encoding apparatus 700.

FIG. 8 includes diagrams regarding a low-level band caused due to a shared-band encoding process by the shared band encoding unit 800 in the acoustic signal encoding apparatus 700. Here, it is assumed that the shared band encoding unit 800 determines the sub-band B[i] of number i, in which the correlation level between the normalized components of the left and right channels is high, to be a shared band and that the normalized component of the left channel in the shared band is quantized.

Parts (a) and (b) of FIG. 8 are diagrams illustrating an example of left normalized components 771 and right normalized components 774 generated by the normalization units 721 and 722 in the acoustic signal encoding apparatus 700, respectively. Part (c) of FIG. 8 is a diagram illustrating normalized absolute difference values 775 that are the absolute difference values between the left normalized components 771 and the right normalized components 774.

Parts (d) and (e) of FIG. 8 are diagrams illustrating an example in which quantized components generated by the left normalized components 771 are shared by the shared band encoding unit 800 as right- and left-channel quantized components 781 and right quantized components 784. Part (f) of FIG. 7 is a diagram illustrating quantized absolute difference values 785 that are the absolute difference values between the left quantized components 781 and the right quantized components 784.

In part (a) of FIG. 8, normalized values Pl of four frequency spectra (f1 to f4) included in the sub-band B[i] of number i in the left channel are illustrated. In part (b) of FIG. 8, normalized values Pr of four frequency spectra (f1 to f4) included in the sub-band B[i] of number i in the right channel are illustrated.

In part (c) of FIG. 8, absolute difference values Pd between the normalized values of the frequency spectra (f1 to f4) in the right and left channels are illustrated. The absolute difference values Pd of the frequency spectra (f1 to f4) exhibit different levels.

In part (d) of FIG. 8, quantized values Q of four frequency spectra (f1 to f4) included in the sub-band B[i] of number i in the left channel are illustrated. The quantized values of the four frequency spectra (f1 to f4) are similar to those in part (d) of FIG. 7.

In part (e) of FIG. 8, quantized values Q of four frequency spectra (f1 to f4) included in the sub-band B[i] of number i in the right channel are illustrated. The quantized values Q of the four frequency spectra (f1 to f4) in the right channel indicate the same values as the quantized values Q of the left channel. That is, the quantized values Q of the frequency spectra (f1 to f4) indicate that the quantized values Q of the left channel are also used for the quantized values Q of the right channel since the shared band encoding unit 800 determines that the sub-band B[i] of number i is a shared band.

In part (f) of FIG. 8, absolute difference values Q of quantized values of the frequency spectra (f1 to f4) in the right and left channels are illustrated. Unlike the absolute difference values 773 illustrated in part (c) of FIG. 8, all the absolute difference values Q of the frequency spectra (f1 to f4) become "0". This is because the normalized values of frequency spectra in the sub-band B[i] of the left channel are shared by the shared band encoding unit 800 as normalized values of both channels.

In this manner, even if the normalized components 771 and 774 generated by the normalization units 721 and 722 are different, a quantized value component generated by the shared band encoding unit 800 is shared as a quantized value of both channels. Thus, when decoded, quantized values are made equal to each other. Therefore, if encoded data in which normalized values of the sub-band [i] of number i are shared by the shared band encoding unit 800 is decoded and difference spectra are calculated on the basis of the decoded compressed signal, a difference spectrum corresponding to the sub-band [i] of number i is set as a low-level band.

[Example of Occurrence of Low-Level Band in Compressed Signal]

Figure 9:
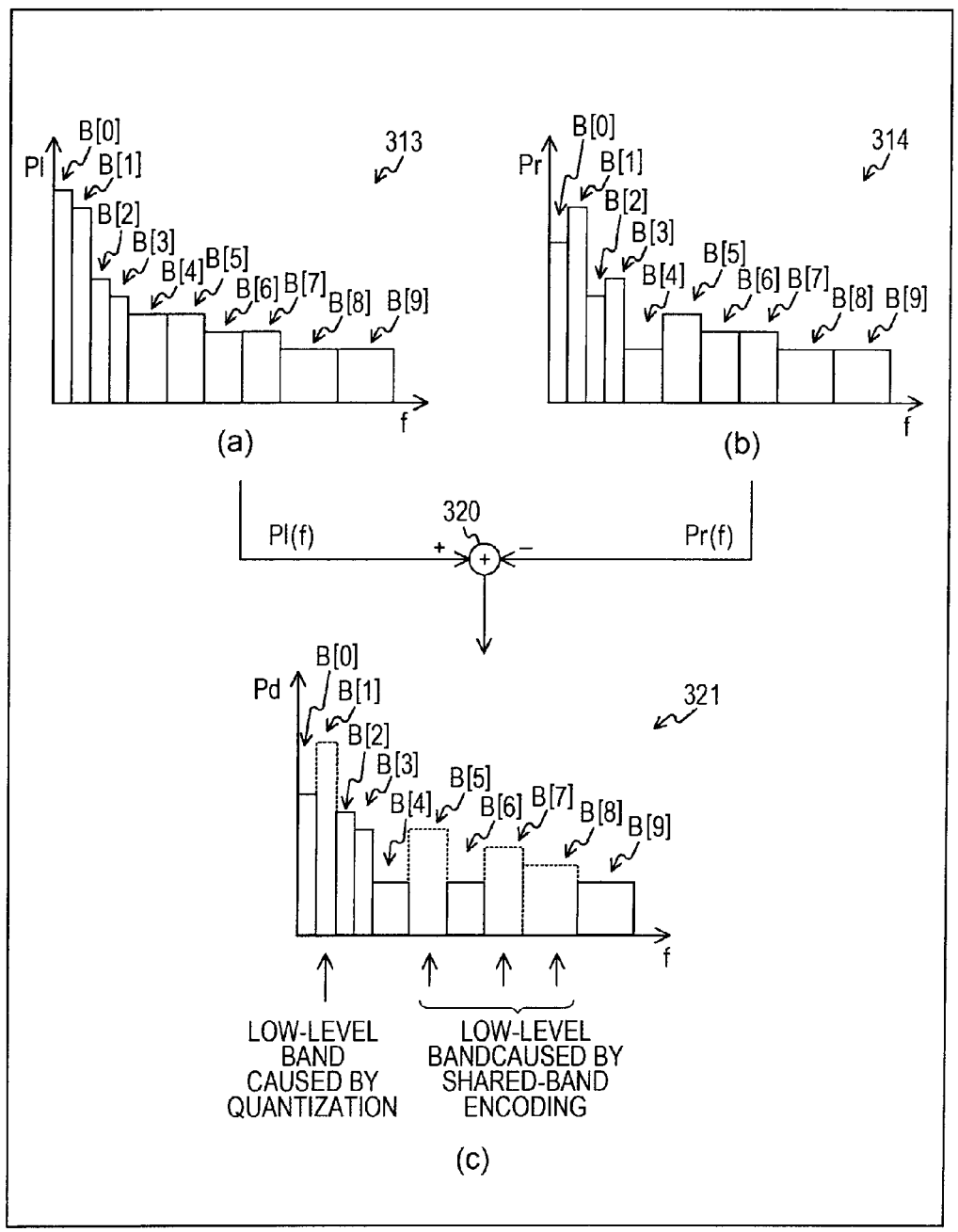
FIG. 9 includes conceptual diagrams illustrating an example of a sub-band B[i] based on a difference spectrum calculated by a difference spectrum calculation unit 320 according to the first embodiment of the present invention.

FIG. 9 includes conceptual diagrams illustrating an example of a sub-band B[i] based on a difference spectrum calculated by the difference spectrum calculation unit 320 according to the first embodiment of the present invention. Here, for convenience of illustration, a spectrum envelope like the frequency spectrum envelope 725 illustrated in part (a) of FIG. 3 is not illustrated.

Parts (a) and (b) of FIG. 9 are diagrams illustrating, by way of example, compressed signal components 313 and 314 in the left- and right-channel acoustic signals generated by the frequency spectrum generation units 311 and 312. Part (c) of FIG. 9 is a diagram illustrating, by way of example, absolute difference value components 321 based on a difference spectrum calculated by the difference spectrum calculation unit 320. Here, the vertical axis represents the magnitude of normalization reference value (scale factor) corresponding to the sub-band B[i], and the horizontal axis represents frequency.

The left- and right-channel compressed signal components 313 and 314 are abstract representations, by using ten sub-bands B[0] to [9], of the left- and right-channel frequency distributions in compressed signals restored by decoding encoded acoustic signals. Note that, as illustrated in part (b) of FIG. 3, the sub-band B[i] includes a plurality of frequency spectra.

The absolute difference value components 321 are abstract representations, by using ten sub-bands B[0] to [9], of the frequency distributions of the absolute difference values of the frequency spectra in the left- and right-channel compressed signal components 313 and 314. Here, as described in FIG. 7, the sub-band B[1] of number 1 is a low-level band in which the quantized values of both channels are made equal to each other by the quantization and in which the levels of the individual difference spectra significantly reduce. Further, as described in FIG. 8, the fifth, seventh, and eighth sub-bands B[5], B[7], and B[8] are low-level bands in which the quantized values of both channels are made equal to each other by the shared-band encoding and in which the levels of the individual difference spectrums greatly reduce.

In this manner, processing such as quantization or shared-band encoding may cause a low-level band in which the level of a difference spectrum calculated by the difference spectrum calculation unit 320 is extremely low. If an accompaniment signal having such a low-level band is output from the speaker 180, the listener may feel the output accompaniment signal as unpleasant sound. Accordingly, in the first embodiment of the present invention, the low-level band determination unit 330 determines a low-level band, and a difference spectrum corresponding to the determined low-level band is substituted for a substitution spectrum. Here, an example of substituting a difference spectrum in a low-level band for a substitution spectrum will be described hereinafter with reference to the drawings.

[Example of Substitution of Difference Spectrum by Audio Component Removal Unit 300]

Figure 10:
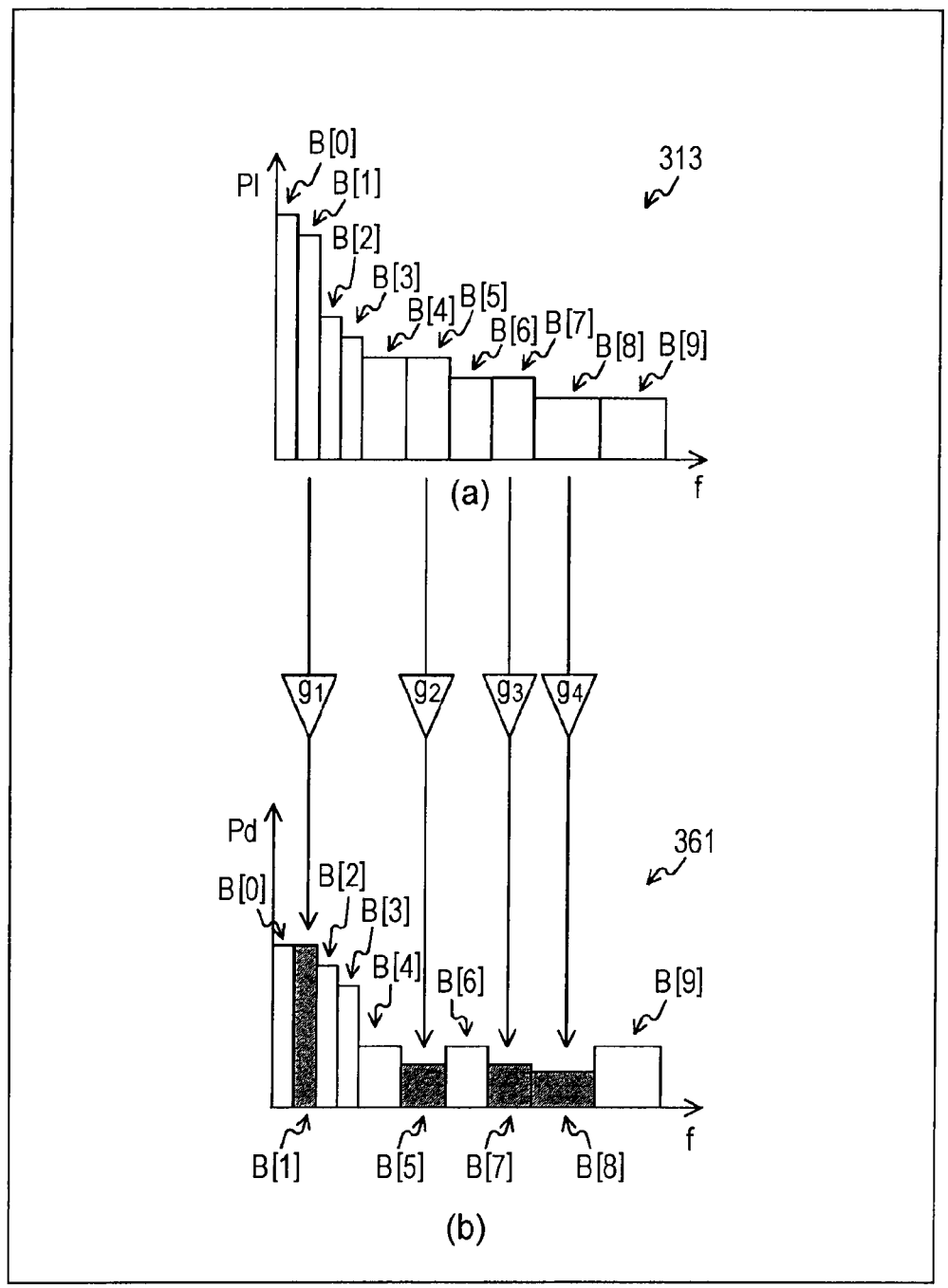
FIG. 10 includes abstract diagrams illustrating an example in which a difference spectrum corresponding to a low-level band is substituted for a substitution spectrum by the audio component removal unit 300 according to the first embodiment of the present invention.

FIG. 10 includes abstract diagrams illustrating an example in which a difference spectrum corresponding to a low-level band is substituted for a substitution spectrum by the audio component removal unit 300 according to the first embodiment of the present invention.

Part (a) of FIG. 10 is a diagram illustrating left-channel compressed signal components 313 supplied to the substitution spectrum generation unit 350. Part (b) of FIG. 10 is a diagram illustrating absolute difference value components 361 obtained after difference spectra of low-level bands in the absolute difference value components 321 illustrated in part (c) of FIG. 9 are substituted for substitution spectra by the spectrum substitution unit 360. Here, the vertical axis represents the magnitude of normalization reference value (scale factor) corresponding to the sub-band B[i], and the horizontal axis represents frequency. Further, the left-channel compressed signal components 313 are similar to those illustrated in part (a) of FIG. 9, and a description thereof is thus omitted here.

The absolute difference value components 361 after substitution exhibit a frequency distribution in which the difference spectra of the sub-bands B[1], B[5], B[7], and B[8] in the absolute difference value components 321, which are determined to be low-level bands by the low-level band determination unit 330, have been substituted for substitution spectra. Here, for convenience of illustration, the frequency distribution is illustrated by using, instead of frequency spectra, the sub-bands B[0] to B[9].

The substitution spectra of the sub-bands B[1], B[5], B[7], and B[8] are generated by the substitution spectrum generation unit 350 on the basis of the frequency spectra of the left channel corresponding to the difference spectra determined to be low-level bands. The levels of the substitution spectra are calculated by substitution spectrum generation unit 350 by multiplying the levels of the frequency spectra corresponding to the low-level bands by the level adjustment coefficients in the level adjustment coefficient holding unit 340.

In this example, the level of the substitution spectrum included in the sub-band B[1] of number 1 is generated by the multiplication value of a level adjustment coefficient g1 corresponding to the sub-band B[1] of number 1 and each frequency spectrum Pl included in the sub-band B[1] of the left channel. Further, the level of the substitution spectrum included in the sub-band B[5] of number 5 is generated by the multiplication value of a level adjustment coefficient g2 corresponding to the sub-band B[5] of number 5 and each frequency spectrum Pl included in the sub-band B[5] of the left channel.

Further, the level of the substitution spectrum included in the sub-band B[7] of number 7 is generated by the multiplication value of a level adjustment coefficient g3 corresponding to the sub-band B[7] of number 7 and each frequency spectrum Pl included in the sub-band B[7] of the left channel. Further, the level of the substitution spectrum included in the sub-band B[8] of number 5 is generated by the multiplication value of a level adjustment coefficient g4 corresponding to the sub-band B[8] of number 8 and each frequency spectrum Pl included in the sub-band B[8] of the left channel.

In this manner, a difference spectrum corresponding to a low-level band is substituted for a substitution spectrum in which a level adjustment coefficient is multiplied by the frequency spectrum of the left channel, and therefore a low-level band in an accompaniment signal can be eliminated. Next, the frequency characteristics of a level adjustment coefficient that adjusts the level of a substitution spectrum for eliminating a low-level band will be described hereinafter with reference to the drawings.

[Example Frequency Characteristics of Level Adjustment Coefficient]

Figure 11:
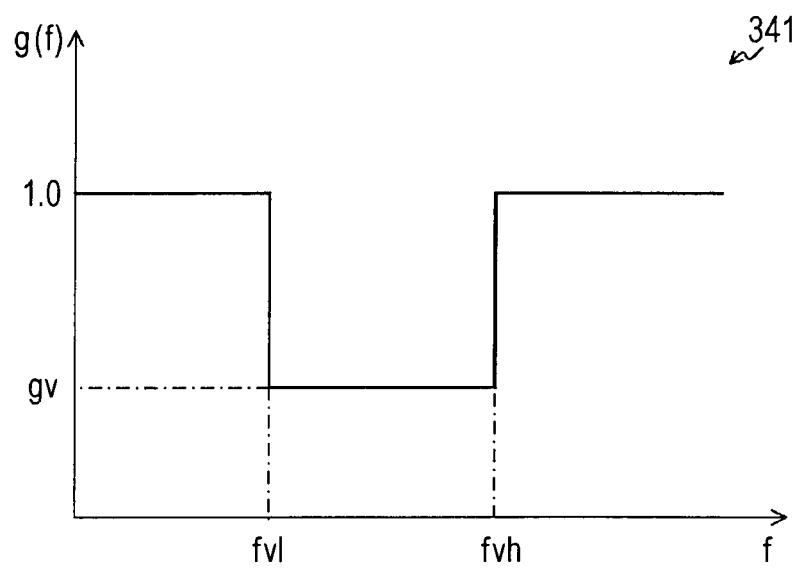
FIG. 11 is a diagram illustrating an example of a frequency characteristic 341 of a level adjustment coefficient held in a level adjustment coefficient holding unit 340 according to the first embodiment of the present invention.

FIG. 11 is a diagram illustrating an example of a frequency characteristic 341 of a level adjustment coefficient held in the level adjustment coefficient holding unit 340 according to the first embodiment of the present invention. Here, the horizontal axis represents frequency, and the vertical axis represents the magnitude of level adjustment coefficient.

The level adjustment coefficient frequency characteristic 341 represents a frequency characteristic of a level adjustment coefficient g(f) for adjusting the level of a substitution spectrum generated by the substitution spectrum generation unit 350. In the level adjustment coefficient frequency characteristic 341, a level adjustment coefficient in a midrange audio band (fvl to fvh) corresponding to the audio components has a different magnitude from a level adjustment coefficient corresponding to a band other than the audio band.

A level adjustment coefficient g(f) corresponding to a band other than the audio band in the level adjustment coefficient frequency characteristic 341 is "1.0". Thus, the level of the substitution spectrum generated by the substitution spectrum generation unit 350 adopts the level of the frequency spectrum of the left channel as it is.

On the other hand, a level adjustment coefficient g(f) corresponding to the audio band (fvl to fvh) in the level adjustment coefficient frequency characteristic 341 is gv. The level adjustment coefficient gv is a value smaller than "1.0". Since the listener feels the audio components in a difference signal sufficiently low when approximately 0.1 is used, it is preferable that the level adjustment coefficient gv be set to approximately 0.1. However, depending on the frequency characteristic in the difference signal, an unnatural feeling may be caused even when approximately 0.1 is set. Thus, in such a case, the level adjustment coefficient gv may be set to approximately 0.2 to 0.3.

In this manner, setting a level adjustment coefficient gv corresponding to an audio band (fvl to fvh) including audio components to be smaller than a level adjustment coefficient corresponding to a band other than the audio band allows the generation of a comfortable accompaniment signal with the audio components sufficiently suppressed. Next, a determination method for determining a difference spectrum corresponding to a low-level band, which is performed by the low-level band determination unit 330, will be described hereinafter with reference to the drawings.

[Method for Determining Difference Spectrum Corresponding to Low-Level Band]

Figure 12:
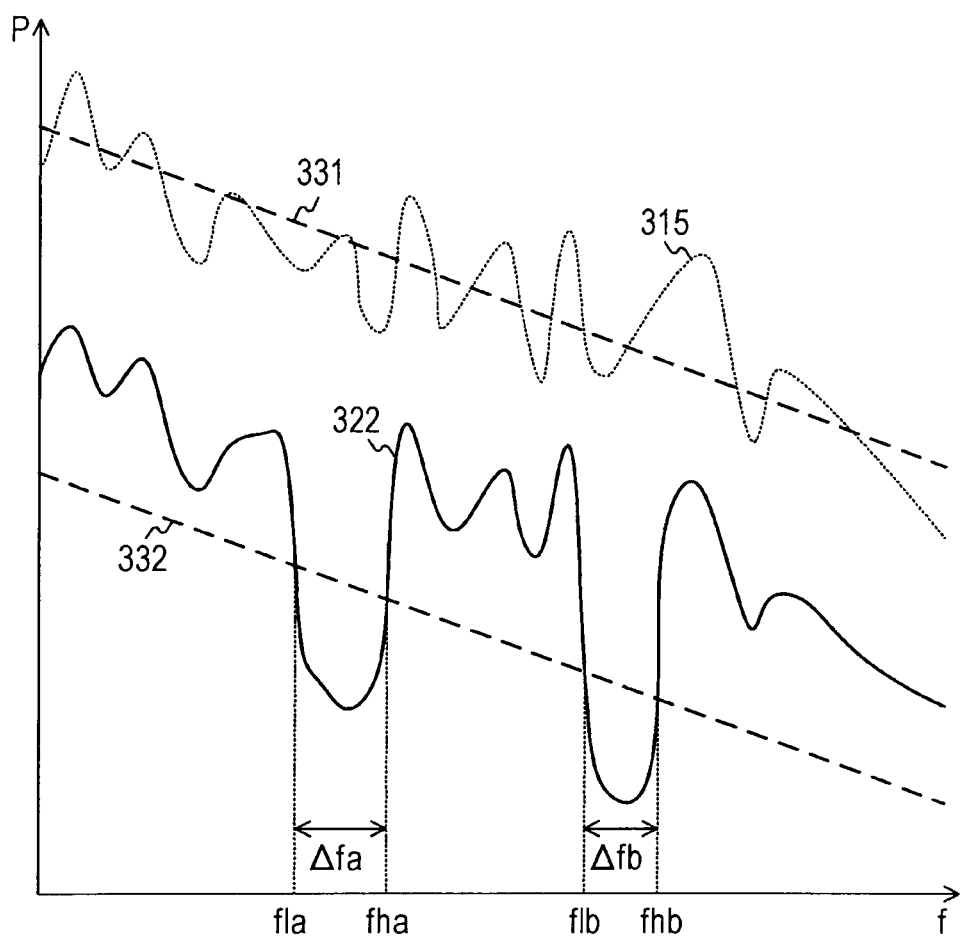
FIG. 12 is a diagram regarding an example of a method for determining a difference spectrum corresponding to a low-level band, which is performed by a low-level band determination unit 330, according to the first embodiment of the present invention.

FIG. 12 is a diagram regarding an example of a method for determining a difference spectrum corresponding to a low-level band, which is performed by the low-level band determination unit 330, according to the first embodiment of the present invention. Here, a left-channel spectrum envelope 315, a left-channel spectrum smooth line 331, a difference spectrum envelope 322, and a low-level threshold line 332 are illustrated. Here, further, the vertical axis represents power, and the horizontal axis represents frequency.

The left-channel spectrum envelope 315 represents the envelope of a frequency spectrum Pl(f) of the left channel generated by the frequency spectrum generation unit 311. Globally, the level Pl(f) of the frequency spectrum decreases as the frequency f increases.

The left-channel spectrum smooth line 331 is a smooth line SMT(f) generated by smoothing the left-channel spectrum envelope 315. In this example, the smooth line SMT(f) is generated by calculating the gradient of the line on the basis of the level of the frequency spectrum of the left channel.

Note that the left-channel spectrum smooth line 331 may be generated by, for example, a moving average. Further, here, an example of calculating the smooth line 331 on the basis of the frequency spectrum of the left channel has been illustrated; however, the smooth line SMT(f) may be generated on the basis of the difference spectrum envelope 322.

The difference spectrum envelope 322 is the envelope of a difference spectrum D(f) calculated by the difference spectrum calculation unit 320. The difference spectrum envelope 322 indicates first and second low-level bands Δfa (fla to fha) and Δfb (flb to fhb) where a level drops rapidly. Further, similarly to the left-channel spectrum envelope 315, globally, the level D(f) of the difference spectrum decreases as the frequency f increases. In this manner, the difference spectrum D(f) and the frequency spectrum Pl(f) of the left channel tend to have globally approximate characteristics.

Note that, here, the levels of difference spectra corresponding to the first and second low-level bands (Δfa and Δfb) in the difference spectrum envelope 322 differ from each other. This is because when encoded data having a band in which quantized values of the left and right channels match each other due to quantization or shared-band encoding is decoded, the frequency spectra of the respective channels are converted from the frequency domain to the time domain. This conversion processing causes a slight difference between the levels of the frequency spectra of the left and right channels in the shared band, and therefore a difference occurs between the spectrum levels of the difference spectrum envelope 322 in the first and second low-level bands (Δfa and Δfb).

The low-level threshold line 332 is a line of a low-level threshold TH(f) that is set on the basis of the left-channel spectrum smooth line 331 and a certain threshold coefficient. The threshold coefficient is configured to be set in accordance with the level of an assumed low-level band. Note that if the threshold coefficient is excessively large, the low-level band determination unit 330 may erroneously determine a non-low-level band as a low-level band. Therefore, it is preferable that threshold coefficient be set to a value as small as possible.

In this manner, with the use of the level Pl(f) of the frequency spectrum of the left channel and the threshold coefficient, the low-level band determination unit 330 can set a low-level threshold line 332 whose frequency characteristics easily approximate the global frequency characteristics of a difference spectrum. Therefore, the low-level band determination unit 330 can determine a difference spectrum corresponding to a more accurate low-level band than that when a certain threshold is provided for all the frequency bands. Note that, here, an example of generating a low-level threshold line 332 on the basis of a frequency spectrum of the left channel has been described; however, a frequency spectrum of the right channel or the sum of frequency spectra of two channels may be used.

[Example Operation of Audio Component Removal Unit 300]

Next, the operation of the audio component removal unit 300 according to the first embodiment of the present invention will be described with reference to the drawings.

Figure 13:
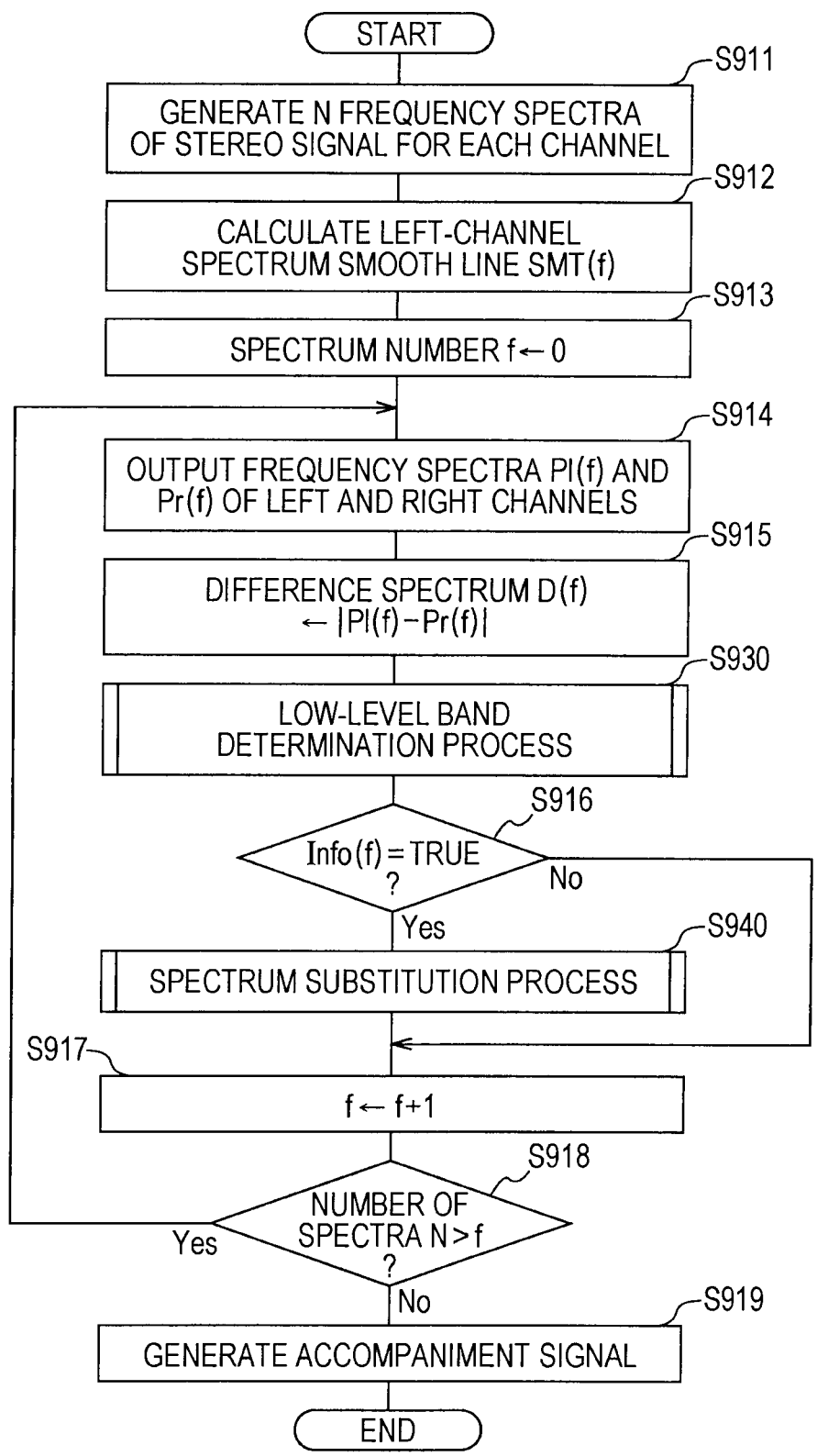
FIG. 13 is a flowchart illustrating an example processing procedure of an accompaniment signal generation method performed by the audio component removal unit 300 according to the first embodiment of the present invention.

FIG. 13 is a flowchart illustrating an example processing procedure of an accompaniment signal generation method performed by the audio component removal unit 300 according to the first embodiment of the present invention.

First, the frequency spectrum generation units 311 and 312 generate, for the respective channels, N frequency spectra on the basis of a stereo signal supplied from the left- and right-channel signal lines 291 and 292 (step S911).

Then, the low-level band determination unit 330 calculates a left-channel spectrum smooth line SMT(f) on the basis of the levels Pl (0 to N−1) of the N frequency spectra in the left channel (step S912). Subsequently, the spectrum number f of the frequency spectra Pl(f) and Pr(f) of the respective channels for which a difference spectrum is to be calculated is set to "0" (step S913).

Thereafter, the levels Pl(0) and Pr(0) of the frequency spectra of number 0 in the left and right channels are output from the frequency spectrum generation units 311 and 312, respectively (step S914). Then, the difference spectrum calculation unit 320 calculates the difference spectrum D(0) of number 0 that is the absolute value of the difference (Pl(0)−Pr(0)) between the frequency spectra of number 0 in the right and left channels (step S915). Note that step S915 is an example of a difference spectrum calculating procedure recited in the claims.

Then, the low-level band determination unit 330 executes a low-level band determination process for determining whether or not the calculated difference spectrum D(0) of number 0 is a difference spectrum corresponding to a low-level band (step S930). Then, the spectrum substitution unit 360 determines whether or not substitution information Info (0) corresponding to the difference spectrum D(0) of number 0 is true (TRUE) (step S916).

Then, in a case where the substitution information Info(0) is true (TRUE), a spectrum substitution process is executed (step S940). On the other hand, in a case where the substitution information Info(0) is not true (TRUE), the process proceeds to step S917 without substituting the difference spectrum (0) of number 0 for a substitution spectrum by the substitution spectrum generation unit 350.

Next, "1" is added to the spectrum number f (step S917). Then, it is determined whether or not the resulting spectrum number f is less than the number of spectra N (step S918). Then, in a case where the spectrum number f is less than the number of spectra N, the process returns to step S914, and the series of processing operations of steps S914 to S918 and S930 is repeated until the spectrum number f matches the number of spectra N.

On the other hand, in a case where the spectrum number f matches the number of spectra N, the accompaniment signal generation unit 370 generates an accompaniment signal by converting the N difference spectra D (0 to N−1) output from the spectrum substitution unit 360 into a time-domain signal (step S919). Thus, the accompaniment signal generation process in which the audio components included in the stereo signal supplied from the left- and right-channel signal lines 291 and 291 are suppressed ends. Note that step S919 is an example of an accompaniment signal generating procedure recited in the claims.

[Example Operation of Low-Level Band Determination Unit 330]

Figure 14:
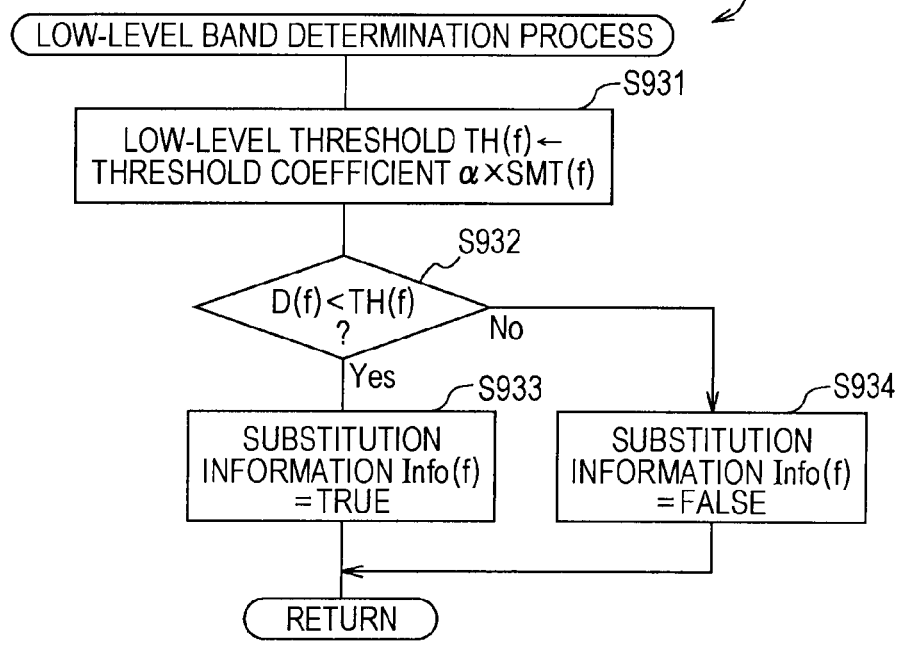
FIG. 14 is a flowchart illustrating an example processing procedure of a low-level band determination process (step S930) performed by the low-level band determination unit 330 according to the first embodiment of the present invention.

FIG. 14 is a flowchart illustrating an example processing procedure of the low-level band determination process (step S930) performed by the low-level band determination unit 330 according to the first embodiment the of the present invention.

First, a low-level threshold TH(f) in which the spectrum smooth line SMT(f) generated in the processing of step S912 is multiplied by a certain threshold coefficient α is calculated (step S931). Note that in this example, an example of generating a spectrum smooth line SMT(f) on the basis of all the frequency spectra in step S912 has been described; however, the average value of a certain number of preceding frequency spectra Pl(f) may be used as the spectrum smooth line SMT (f).

Then, it is determined whether or not the difference spectrum level D(f) output from the difference spectrum calculation unit 320 is less than the low-level threshold TH(f) (step S932). That is, it is determined whether or not the difference spectrum D(f) output from the difference spectrum calculation unit 320 is a difference spectrum corresponding to a low-level band.

Then, in a case where the difference spectrum D(f) is less than the low-level threshold TH(f), the substitution information Info(f) is set to true (TRUE) in order to substitute the level of the difference spectrum for the level of a substitution spectrum (step S933). That is, a frequency band in which a level drops rapidly in the envelope of the difference spectrum is determined to be a low-level band. Note that steps S932 and S933 are examples of a low-level band determining procedure recited in the claims.

On the other hand, in a case where the difference spectrum D(f) is greater than or equal to the low-level threshold TH(f), there is no need to substitute the difference spectrum D(f) for a substitution spectrum. Thus, the substitution information Info(f) is set to false (FALSE) (step S934). After the processing operation of step S933 or S934 is executed, the low-level band determination process ends.

[Example Operation of Substitution Spectrum Generation Unit 350 and Spectrum Substitution Unit 360]

Figure 15:
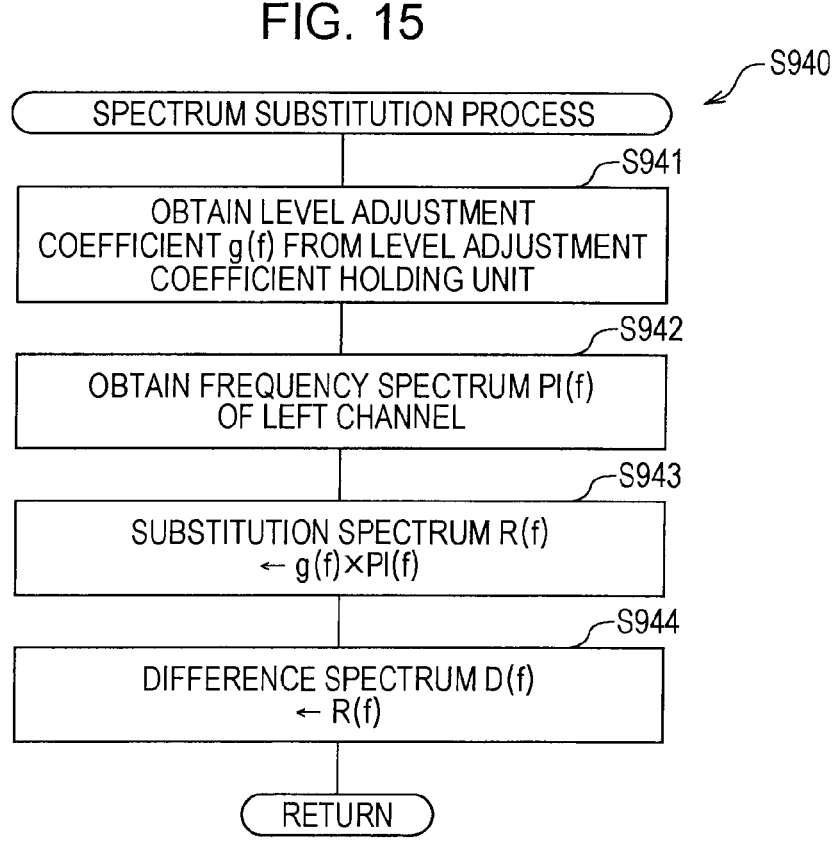
FIG. 15 is a flowchart illustrating an example processing procedure of a spectrum substitution process (step S940) performed by a spectrum substitution unit 360 according to the first embodiment of the present invention.

FIG. 15 is a flowchart illustrating an example processing procedure of the spectrum substitution process (step S940) performed by the spectrum substitution unit 360 according to the first embodiment of the present invention.

First, the substitution spectrum generation unit 350 obtains a level adjustment coefficient g(f) from the level adjustment coefficient holding unit 340 (step S941). Subsequently, the substitution spectrum generation unit 350 obtains a frequency spectrum Pl(f) from the frequency spectrum generation unit 311 of the left channel (step S942).

Then, the substitution spectrum generation unit 350 calculates a substitution spectrum R(f) by multiplying the obtained level adjustment coefficient g(f) by the frequency spectrum Pl(f) of the left channel (step S943). That is, the substitution spectrum generation unit 350 generates a substitution spectrum for which a difference spectrum is substituted, on the basis of the frequency spectrum of the left-channel acoustic signal. Note that step S943 is an example of a substitution spectrum generating procedure recited in the claims.

Subsequently, the spectrum substitution unit 360 generates a new difference spectrum D(f) by substituting a difference spectrum D(f) corresponding to a low-level band for the calculated substitution spectrum R(f) (step S944), and then the spectrum substitution process ends. Note that step S944 is an example of a spectrum substituting procedure recited in the claims.

In this manner, in the first embodiment of the present invention, a difference spectrum D(f) corresponding to a low-level band is substituted for a substitution spectrum generated on the basis of a frequency spectrum Pl(f) of the left channel, thus allowing the generation of a comfortable accompaniment signal.

Further, as illustrated in FIG. 11, a level adjustment coefficient g(f) corresponding to the audio band is set smaller than that of the other bands, thus allowing sufficient suppression of the audio components in the accompaniment signal. However, in this case, when the accompaniment components in the accompaniment signal are large, the level of a substitution spectrum corresponding to the audio band is relatively excessively lower than the level of the other difference spectra, and an unnatural accompaniment signal in the auditory sense may be caused.

In contrast, an improvement for adjusting the level of a substitution spectrum corresponding to the audio band in accordance with the magnitude of the accompaniment components to suppress excessive increase of the difference in level between the substitution spectrum and the other difference spectra is provided in a second embodiment described in the following section.

2. Second Embodiment

[Example Configuration of Audio Component Removal Unit 300]

Figure 16:
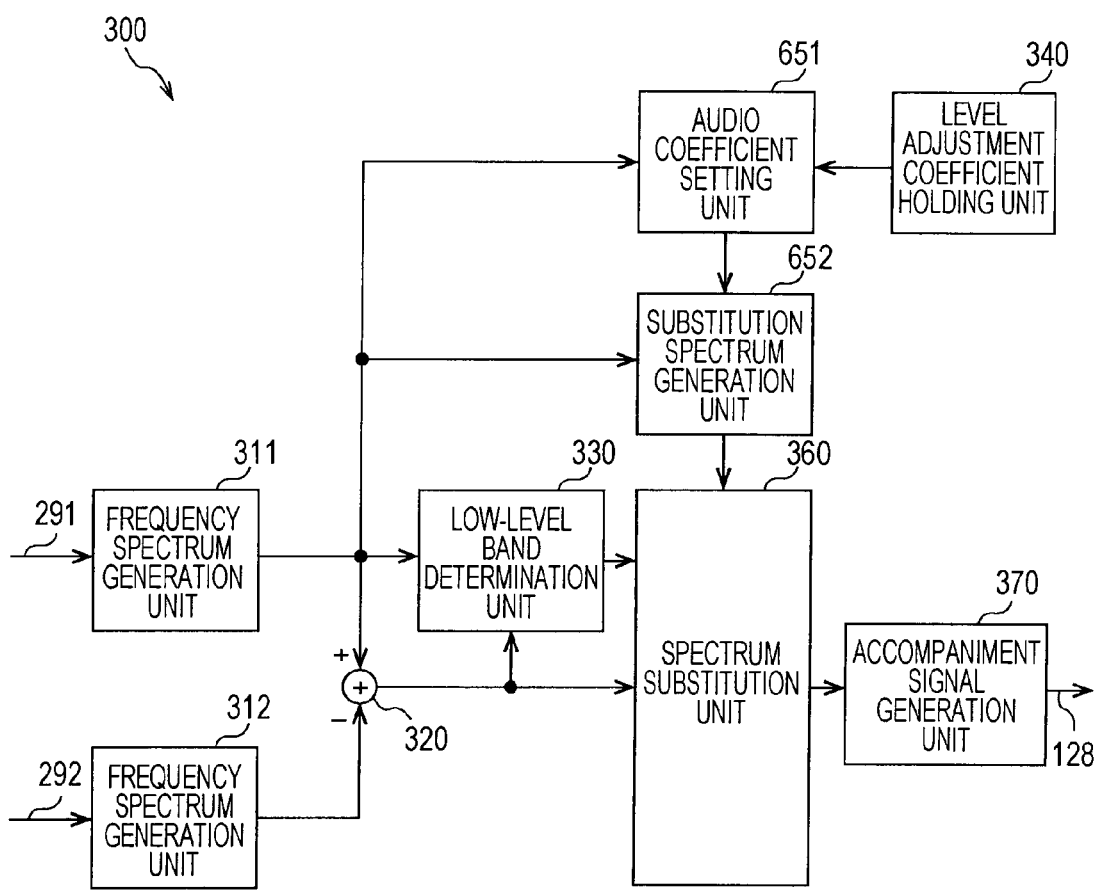
FIG. 16 is a diagram illustrating an example configuration of an audio component removal unit 300 according to a second embodiment of the present invention.

FIG. 16 is a diagram illustrating an example configuration of an audio component removal unit 300 according to a second embodiment of the present invention. The audio component removal unit 300 includes, in place of the substitution spectrum generation unit 350 illustrated in FIG. 5, an audio coefficient setting unit 651 and a substitution spectrum generation unit 652. Here, the configuration other than the audio coefficient setting unit 651 and the substitution spectrum generation unit 652 is similar to that of FIG. 5. Thus, the same numerals as those of FIG. 5 are given, and a description thereof is omitted here.

The audio coefficient setting unit 651 is configured to set an audio coefficient on the basis of a frequency spectrum of the left channel, which is sent from the frequency spectrum generation unit 311, and on the basis of a level adjustment coefficient corresponding to the audio band, which is sent from the level adjustment coefficient holding unit 340. The audio coefficient setting unit 651 sets an audio coefficient corresponding to the audio band on the basis of the level ratio of a frequency spectrum corresponding to a band other than the audio band to a frequency spectrum corresponding to the audio band in the entire frequency spectrum of the left channel.

The audio coefficient setting unit 651 sets an audio coefficient on the basis of, for example, the level ratio of an average level of a frequency spectrum corresponding to a band other than the audio band to an average level of a frequency spectrum corresponding to the audio band within the frequency spectrum of the left channel. That is, the audio coefficient setting unit 651 sets an audio coefficient to be larger for a higher level of a frequency spectrum corresponding to a band other than the audio band, and sets an audio coefficient to be smaller for a higher level of a frequency spectrum corresponding to the audio band.

Further, the audio coefficient setting unit 651 supplies the set audio coefficient and a level adjustment coefficient corresponding to a band other than the audio band, which is held in the level adjustment coefficient holding unit 340, to the substitution spectrum generation unit 652. Note that the audio coefficient setting unit 651 is an example of an audio coefficient setting unit recited in the claims.

The substitution spectrum generation unit 652 generates a substitution spectrum on the basis of the frequency spectrum of the left channel and the audio coefficient or level adjustment coefficient corresponding to the frequency spectrum, which is sent from the audio coefficient setting unit 651. The substitution spectrum generation unit 652 generates a substitution spectrum on the basis of the frequency spectrum of the left channel sent from the frequency spectrum generation unit 311 and the audio coefficient set by the audio coefficient setting unit 651.

The substitution spectrum generation unit 652 calculates the level of a substitution spectrum by, for example, multiplying the level of the frequency spectrum of the left channel by the audio coefficient or level adjustment coefficient sent from the audio coefficient setting unit 651. Further, the substitution spectrum generation unit 652 supplies the calculated substitution spectrum to the spectrum substitution unit 360. Note that the substitution spectrum generation unit 652 corresponds to the substitution spectrum generation unit 350 illustrated in FIG. 5. Further, the substitution spectrum generation unit 652 is an example of a substitution spectrum generation unit recited in the claims.

In this manner, with the provision of the audio coefficient setting unit 651, the level of a substitution spectrum corresponding to the audio band can be adjusted in accordance with the level of the frequency spectrum of the left channel. Here, an example regarding an audio coefficient setting method performed by the audio coefficient setting unit 651 will be described with reference to the drawings.

[Example of Audio Coefficient Setting Method]

Figure 17:
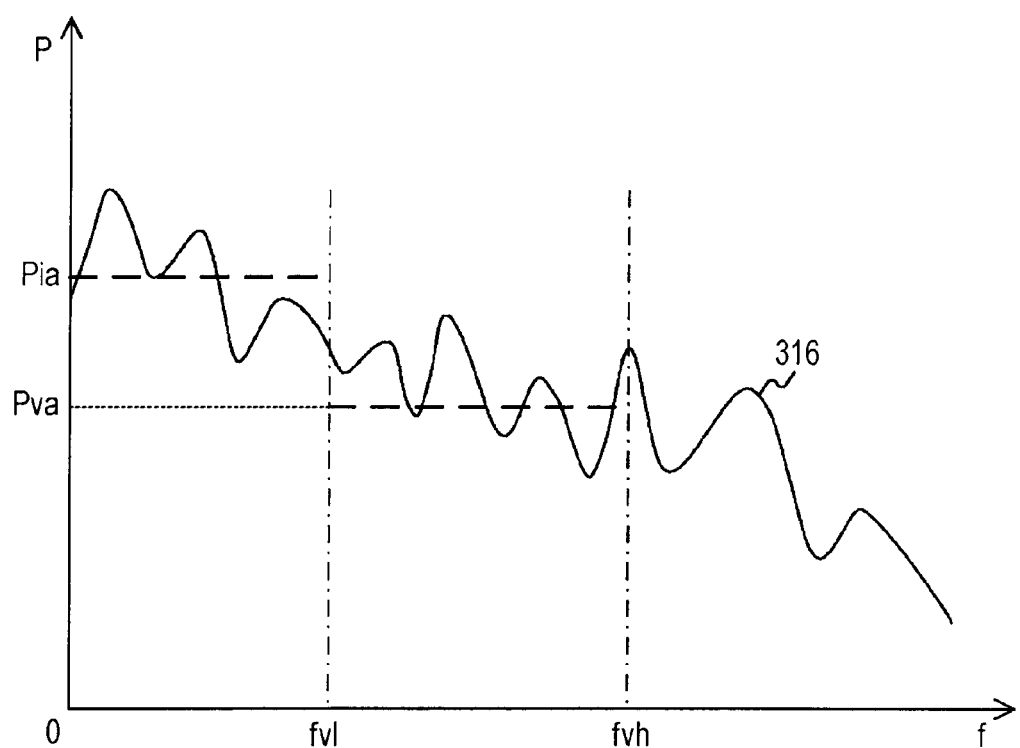
FIG. 17 is a diagram illustrating an example regarding an audio coefficient setting method performed by an audio coefficient setting unit 651 according to the second embodiment of the present invention.

FIG. 17 is a diagram illustrating an example regarding an audio coefficient setting method performed by the audio coefficient setting unit 651 according to the second embodiment of the present invention. Here, a left-channel spectrum envelope Pl(f) 316, an accompaniment band average value Pia, and an audio band average value Pva are illustrated. Further, the vertical axis represents the power value, and the horizontal axis represents frequency.

The left-channel spectrum envelope Pl(f) represents the envelope of a frequency spectrum Pl(f) of the left channel generated by the frequency spectrum generation unit 311. The accompaniment band average value Pia represents the average value of the frequency spectrum Pl(f) in an accompaniment band (0 to fvl). The accompaniment band average value Pia is calculated by the audio coefficient setting unit 651. The audio band average value Pva represents the average value of the frequency spectrum Pl(f) in an audio band (fvl to fvh). The audio band average value Pva is calculated by the audio coefficient setting unit 651.

In this case, the audio coefficient setting unit 651 calculates an audio coefficient V according to, for example, the equation below. Here, gv denotes the level adjustment coefficient corresponding to the audio band, which is held in the level adjustment coefficient holding unit 340.

$$V = gv \times (Pia/Pva)$$

From the equation above, as the accompaniment band average value Pia increases, the level adjustment coefficient gv based on the audio coefficient V increases, and as the audio band average value Pva increases, the audio coefficient V based on the level adjustment coefficient gv decreases.

In this manner, in a case where the accompaniment band average value Pia is larger than the audio band average value Pva, the audio coefficient V takes a value larger than the level adjustment coefficient gv. Thus, the level of a substitution spectrum corresponding to the audio band increases, and the difference in level from the difference spectrum corresponding to a band other than the audio band decreases. Therefore, auditory noise in the accompaniment signal can be suppressed.

On the other hand, in a case where the accompaniment band average value Pia is smaller than the audio band average value Pva, the audio coefficient V takes a value smaller than the level adjustment coefficient gv. Thus, the level of a substitution spectrum corresponding to the audio band decreases, and the difference in level from the difference spectrum corresponding to a band other than the audio band decreases. Therefore, auditory noise in the accompaniment signal can be suppressed. Further, in this case, the level of the substitution spectrum corresponding to the audio components is reduced. Therefore, the audio components in the accompaniment signal can be suppressed more than that for a certain level adjustment coefficient gv.

In this manner, in the second embodiment of the present invention, with the provision of the audio coefficient setting unit 651, the level of a substitution spectrum corresponding to the audio band can be adjusted in accordance with the characteristics of a frequency spectrum of the left channel. That is, the level of the substitution spectrum corresponding to the audio band can be adjusted on the basis of the frequency characteristics of a frequency spectrum of the left channel that approximate the frequency characteristics of a difference spectrum.

Therefore, auditory noise caused by the difference in level between a difference spectrum in an accompaniment signal and a substitution spectrum can be suppressed more than that in the first embodiment. Next, the operation of the audio coefficient setting unit 651 will be described hereinafter with reference to a flowchart of the spectrum substitution process.

[Example Processing Procedure of Spectrum Substitution Process]

Figure 18:
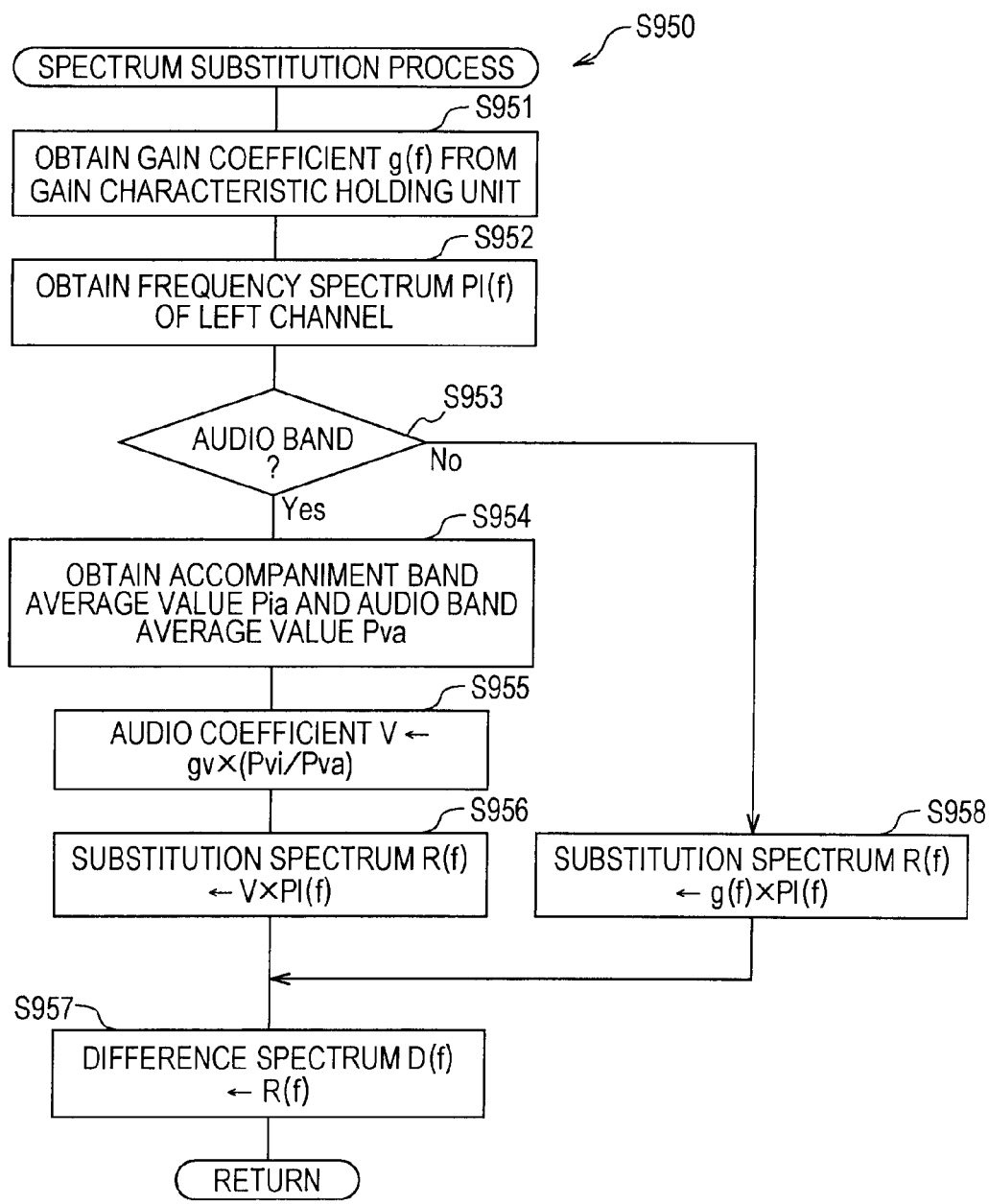
FIG. 18 is a flowchart illustrating an example processing procedure of a spectrum substitution process (step S950) performed by the audio component removal unit 300 according to the second embodiment of the present invention.

FIG. 18 is a flowchart illustrating an example processing procedure of a spectrum substitution process (step S950) performed by the audio component removal unit 300 according to the second embodiment of the present invention. The processing of step S950 corresponds to the processing of step S940 illustrated in FIG. 13. Further, here, it is assumed that the audio coefficient setting unit 651 calculates an accompaniment band average value Pia and an audio band average value Pva on the basis of the level of the frequency spectrum sent from the frequency spectrum generation unit 311. Further, it is assumed that the level adjustment coefficient holding unit 340 holds a level adjustment coefficient gv corresponding to the audio band illustrated in FIG. 11.

First, the audio coefficient setting unit 651 obtains a level adjustment coefficient g(f) from the level adjustment coefficient holding unit 340 (step S951). Subsequently, the substitution spectrum generation unit 652 obtains a frequency spectrum Pl(f) of the left channel from the frequency spectrum generation unit 311 (step S952).

Thereafter, the audio coefficient setting unit 651 determines whether or the spectrum number f is a number corresponding to the audio band (step S953). Then, in a case where the spectrum number f is not a number corresponding to the audio band, the substitution spectrum generation unit 652 calculates a substitution spectrum R(f) by multiplying the level adjustment coefficient g(f) by the frequency spectrum Pl(f) of the left channel (step S958).

On the other hand, in a case where the spectrum number f is a number corresponding to the audio band, the accompaniment band average value Pia and the audio band average value Pva are obtained (step S954). Subsequently, the audio coefficient setting unit 651 calculates an audio coefficient V by multiplying the ratio of the accompaniment band average value Pia to the audio band average value Pva by the level adjustment coefficient gv corresponding to the audio band (step S955).

Subsequently, the substitution spectrum generation unit 652 calculates a substitution spectrum R(f) by multiplying the calculated audio coefficient V by the frequency spectrum Pl(f) of the left channel (step S956). Note that steps S953 to S956 and S958 are examples of a substitution spectrum generating procedure recited in the claims.

Then, the spectrum substitution unit 360 substitutes a difference spectrum D(f) for the calculated substitution spectrum R(f) (step S957), and then the spectrum substitution process ends. Note that step S957 is an example of a spectrum substituting procedure recited in the claims.

In this manner, in the second embodiment of the present invention, the level of a substitution spectrum corresponding to the audio band can be appropriately adjusted in accordance with the magnitude of the accompaniment components in a frequency spectrum of the left channel whose frequency characteristics approximate those of a difference spectrum.

In this manner, according to an embodiment of the present invention, in a case where an accompaniment signal is generated on the basis of a frequency spectrum in a compressed signal, a comfortable accompaniment signal can be generated by substituting a difference spectrum corresponding to a low-level band for a substitution spectrum. That is, a more natural accompaniment signal can be generated by correcting the frequency components of a difference signal on the basis of a frequency spectrum of the left channel whose frequency characteristics approximate those of the difference signal.

Note that in an embodiment of the present invention, an example of generating a substitution spectrum on the basis of a frequency spectrum of the left channel has been described; however, a substitution spectrum may be generated on the basis of a frequency spectrum of the right channel sent from the frequency spectrum generation unit 312. As another example, a substitution spectrum may be generated on the basis of the levels of frequency spectra of the right and left channels. An example configuration of the audio component removal unit 300 in this case will be described as a third embodiment hereinafter with reference to the drawings.

3. Third Embodiment

Figure 19:
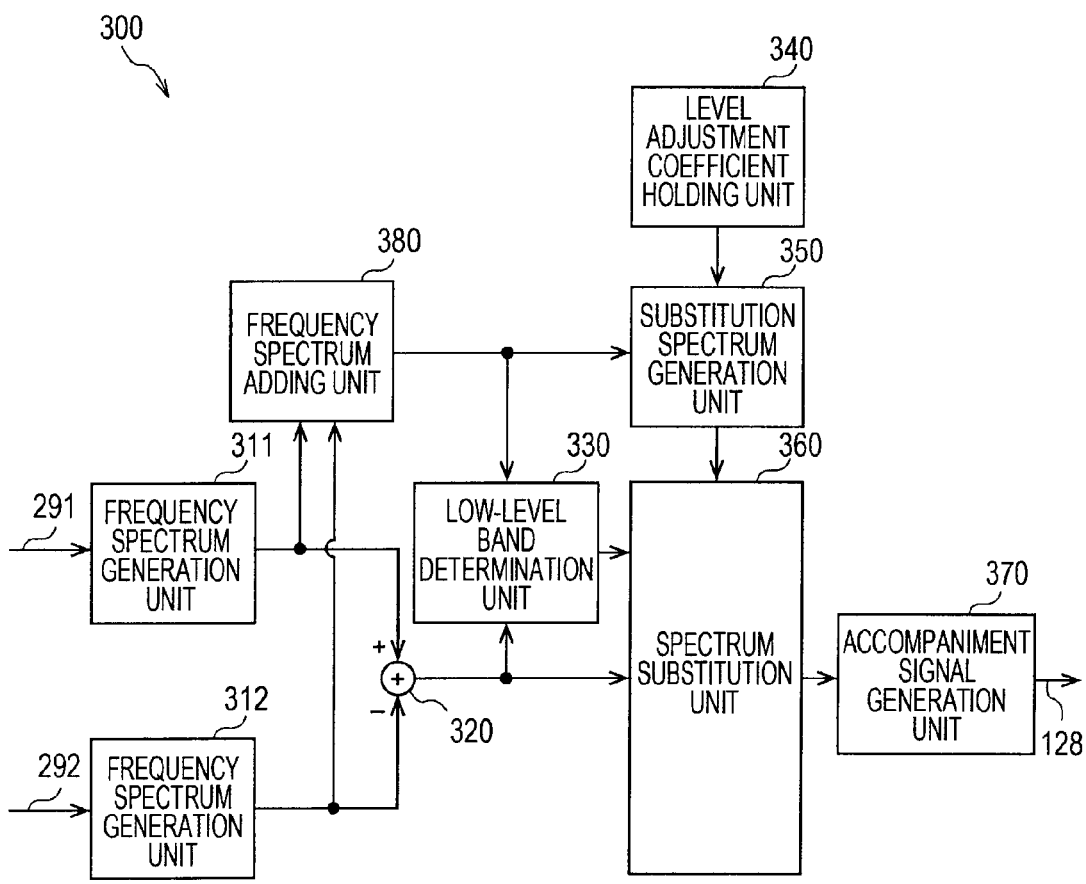
FIG. 19 is a block diagram illustrating an example configuration of an audio component removal unit 300 according to a third embodiment of the present invention.

FIG. 19 is a block diagram illustrating an example configuration of an audio component removal unit 300 according to a third embodiment of the present invention. The audio component removal unit 300 includes a frequency spectrum adding unit 380 in addition to the audio component removal unit 300 illustrated in FIG. 5. Here, the configuration other than the frequency spectrum adding unit 380 is similar to that illustrated in FIG. 5. Thus, the same numerals are given, and a description thereof is omitted here.

The frequency spectrum adding unit 380 is configured to add frequency spectra of the right and left channels, which are supplied from the frequency spectrum generation units 311 and 312, and to divide the resulting sum value by 2. That is, the frequency spectrum adding unit 380 calculates the average value of the frequency spectra of the left and right channels. Further, the frequency spectrum adding unit 380 supplies the calculated average value of the frequency spectra to the substitution spectrum generation unit 350 and the low-level band determination unit 330.

In this manner, in the third embodiment of the present invention, with the provision of the frequency spectrum adding unit 380, the frequency components of a difference signal can be corrected using a substitution spectrum on the basis of the average value of frequency characteristics of both right and left channels. Thus, the bias of components included in acoustic signals of the right and left channels is removed. Therefore, more natural spectrum correction can be achieved. That is, a substitution spectrum is generated on the basis of at least one of frequency spectra in acoustic signals of two channels, thus allowing suppression of auditory noise in the accompaniment signal.

Note that in an embodiment of the present invention, an enhancement filter that enhances the low frequency components in order to enhance the accompaniment components, an attenuation filter that attenuates the intermediate frequency components in order to attenuate the audio components, or the like may be provided after the accompaniment signal generation unit 370.

Note that an embodiment of the present invention illustrates an example for embodying the present invention, and, as is clearly described in the embodiments of the present invention, the matters in the embodiments of the present invention and the matters to define the invention have correspondences. Similarly, the matters to define the invention recited in the claims and the matters with the same names in the embodiments of the present invention have correspondences. However, the present invention is not limited to the embodiments, and can be embodied by a variety of modifications made to the embodiments without departing from the scope of the present invention.

Further, the processing procedures described in the embodiments of the present invention may be regarded as a method having the series of procedures, and may also be regarded as a program for causing a computer to execute the series of procedures or as a recording medium storing the program. Examples of the recording medium include a CD (Compact Disc), an MD (Mini Disc), a DVD (Digital Versatile Disk), a memory card, a Blu-ray Disc (registered trademark).

REFERENCE SIGNS LIST 100 music playback apparatus
110 operation receiving unit
120 control unit
130 display unit
140 acoustic data storage unit
150 acoustic data input unit
160 analog conversion unit
170 amplifier
180 speaker
200 acoustic signal decoding processing unit
210 decoding unit
221 left-channel dequantization unit
222 right-channel dequantization unit
223 shared band dequantization unit
231, 232 selection unit
241 denormalization unit
251 acoustic signal generation unit
300 audio component removal unit
311, 312 frequency spectrum generation unit
320 difference spectrum calculation unit
330 low-level band determination unit
340 level adjustment coefficient holding unit
350 substitution spectrum generation unit
360 spectrum substitution unit
370 accompaniment signal generation unit
380 frequency spectrum adding unit
651 audio coefficient setting unit
652 substitution spectrum generation unit

The invention claimed is:

1. An acoustic signal processing apparatus comprising:
a difference spectrum calculation unit that calculates, as a difference spectrum, a difference between frequency spectra of acoustic signals of two channels;
a low-level band determination unit that determines a low-level band in an envelope of the difference spectrum based on a low-level threshold;
a substitution spectrum generation unit that generates a substitution spectrum for which the difference spectrum is substituted, on the basis of at least one of the frequency spectra of the acoustic signals of the two channels;
a spectrum substitution unit that substitutes a difference spectrum corresponding to the low-level band within the difference spectrum calculated by the difference spectrum calculation unit, for the substitution spectrum; and
an accompaniment signal generation unit that generates an accompaniment signal by converting a frequency spectrum output from the spectrum substitution unit into a time-domain signal.

2. The acoustic signal processing apparatus according to claim 1, wherein
the substitution spectrum generation unit generates the substitution spectrum on the basis of at least one frequency spectrum of the acoustic signals of the two channels and a predetermined level adjustment coefficient for adjusting a level of the substitution spectrum.

3. The acoustic signal processing apparatus according to claim 2, wherein
the substitution spectrum generation unit generates the substitution spectrum on the basis of a level adjustment coefficient of an audio band, which is smaller than a level adjustment coefficient corresponding to a band other than the audio band, and the level of the at least one frequency spectrum.

4. The acoustic signal processing apparatus according to claim 1, further comprising
an audio coefficient setting unit that sets an audio coefficient corresponding to an audio band on the basis of a level ratio of, in at least one frequency spectrum of the acoustic signals of the two channels, a frequency spectrum corresponding to a band other than the audio band to a frequency spectrum corresponding to the audio band,
wherein the substitution spectrum generation unit generates the substitution spectrum on the basis of the at least one frequency spectrum and the audio coefficient set by the audio coefficient setting unit.

5. The acoustic signal processing apparatus according to claim 4, wherein
the audio coefficient setting unit sets the audio coefficient to be larger for a higher level of the frequency spectrum corresponding to the band other than the audio band, and sets the audio coefficient to be smaller for a higher level of the frequency spectrum corresponding to the audio band.

6. The acoustic signal processing apparatus according to claim 1, wherein
the low-level band determination unit determines the low-level band using the low-level threshold, which is set on the basis of a level of at least one frequency spectrum of the acoustic signals of the two channels, and a level of the difference spectrum.

7. An accompaniment signal generation method comprising:
calculating, as a difference spectrum, a difference between frequency spectra of acoustic signals of two channels;
determining a low-level band in an envelope of the difference spectrum based on a low-level threshold;
generating a substitution spectrum for which the difference spectrum is substituted, on the basis of at least one of the frequency spectra of the acoustic signals of the two channels;
substituting a difference spectrum corresponding to the low-level band within the difference spectrum, for the substitution spectrum; and
generating an accompaniment signal by converting a frequency spectrum output from the substitution into a time-domain signal.

8. A non-transitory computer readable storage medium having stored thereon, a computer program, the computer program when executed by a computer causes the computer to perform steps comprising:
calculating, as a difference spectrum, a difference between frequency spectra of acoustic signals of two channels;
determining a low-level band in an envelope of the difference spectrum based on a low-level threshold;
generating a substitution spectrum for which the difference spectrum is substituted, on the basis of at least one of the frequency spectra of the acoustic signals of the two channels;
substituting a difference spectrum corresponding to the low-level band within the difference spectrum, for the substitution spectrum; and
generating an accompaniment signal by converting a frequency spectrum output from the substitution into a time-domain signal.

\* \* \* \* \*